US011440130B2

(12) United States Patent
Taminger et al.

(10) Patent No.: US 11,440,130 B2
(45) Date of Patent: Sep. 13, 2022

(54) PROCESS CONTROL OF ELECTRON BEAM WIRE ADDITIVE MANUFACTURING

(71) Applicant: U.S.A. as represented by the Administrator of the National Aeronautics and Space Administration, Washington, DC (US)

(72) Inventors: Karen M. Taminger, Yorktown, VA (US); Robert A. Hafley, Yorktown, VA (US); Joseph N. Zalameda, Poquoson, VA (US); Christopher S. Domack, Carrollton, VA (US); Brian L. Taminger, Yorktown, VA (US); Eric R. Burke, Yorktown, VA (US); Richard E. Martin, Yorktown, VA (US); William J. Seufzer, Yorktown, VA (US); Theresa A. Butler, Yorktown, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 426 days.

(21) Appl. No.: 15/489,247

(22) Filed: Apr. 17, 2017

(65) Prior Publication Data
US 2017/0297140 A1    Oct. 19, 2017

Related U.S. Application Data

(60) Provisional application No. 62/323,355, filed on Apr. 15, 2016.

(51) Int. Cl.
*B23K 15/00* (2006.01)
*B23K 15/02* (2006.01)
(Continued)

(52) U.S. Cl.
CPC ........ *B23K 15/0086* (2013.01); *B23K 15/002* (2013.01); *B23K 15/0006* (2013.01);
(Continued)

(58) Field of Classification Search
CPC ......... B23K 15/00; B23K 15/06; B23K 15/02
(Continued)

(56) References Cited

U.S. PATENT DOCUMENTS 6,122,564 A * 9/2000 Koch .................... B22F 3/1055
                                                       700/123
6,627,850 B1 * 9/2003 Koga ................... B23K 9/0956
                                                    219/137 PS
(Continued)

OTHER PUBLICATIONS

Karen M. Taminger et al., In-Process Thermal imaging of the ElectronBeam Freeform Fabrication Process, Proceedings of SPIE, vol. 9861, 986102-11 (11 pages), 2016.

*Primary Examiner* — Dana Ross
*Assistant Examiner* — Joe E Mills, Jr.
(74) *Attorney, Agent, or Firm* — Jennifer L. Riley; Robin W. Edwards; Helen M. Galus

(57) ABSTRACT

A method of controlling operation of an electron beam gun and wire feeder during deposition of pools of molten matter onto a substrate to form beads upon solidification of the molten matter. The method includes providing a substrate and a wire source. A molten pool of liquid phase metal is formed on the substrate by melting the wire utilizing an electron beam generated by an electron beam gun. The liquid metal solidifies into a solid phase. A controller utilizes data from a sensor to adjust a process perimeter based, at least in part, on data generated by the sensor.

20 Claims, 10 Drawing Sheets
(6 of 10 Drawing Sheet(s) Filed in Color)

(51) Int. Cl.
*B23K 15/06* (2006.01)
*B23K 103/04* (2006.01)
*B23K 103/10* (2006.01)
*B23K 103/14* (2006.01)
*B23K 103/18* (2006.01)

(52) U.S. Cl.
CPC .......... *B23K 15/0093* (2013.01); *B23K 15/02* (2013.01); *B23K 15/06* (2013.01); *B23K 2103/05* (2018.08); *B23K 2103/10* (2018.08); *B23K 2103/14* (2018.08); *B23K 2103/26* (2018.08)

(58) Field of Classification Search
USPC ................ 219/121.12–121.35, 121.6–121.86
See application file for complete search history.

(56) References Cited

U.S. PATENT DOCUMENTS

| | | | |
|---|---|---|---|
| 8,344,281 B2 | 1/2013 | Taminger et al. | |
| 8,452,073 B2 | 5/2013 | Taminger et al. | |
| 2005/0173380 A1* | 8/2005 | Carbone | B22F 3/1055 219/121.31 |
| 2010/0260410 A1* | 10/2010 | Taminger | H01J 37/304 382/141 |
| 2014/0124483 A1* | 5/2014 | Henn | B23K 15/0086 219/76.1 |
| 2016/0144452 A1* | 5/2016 | Liou | B23K 31/125 219/121.83 |
| 2017/0259373 A1* | 9/2017 | Albert | B23K 26/082 |

\* cited by examiner

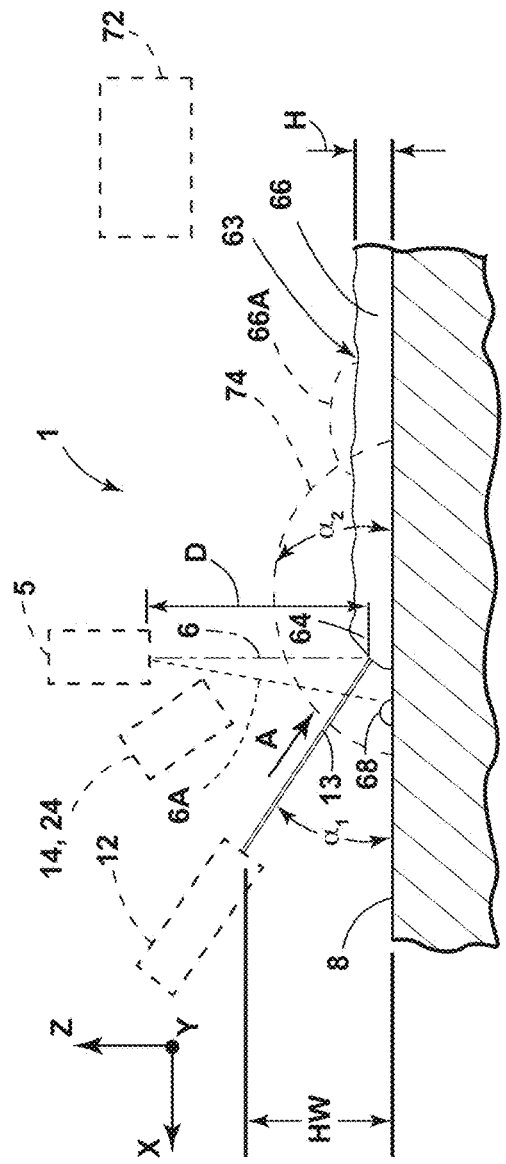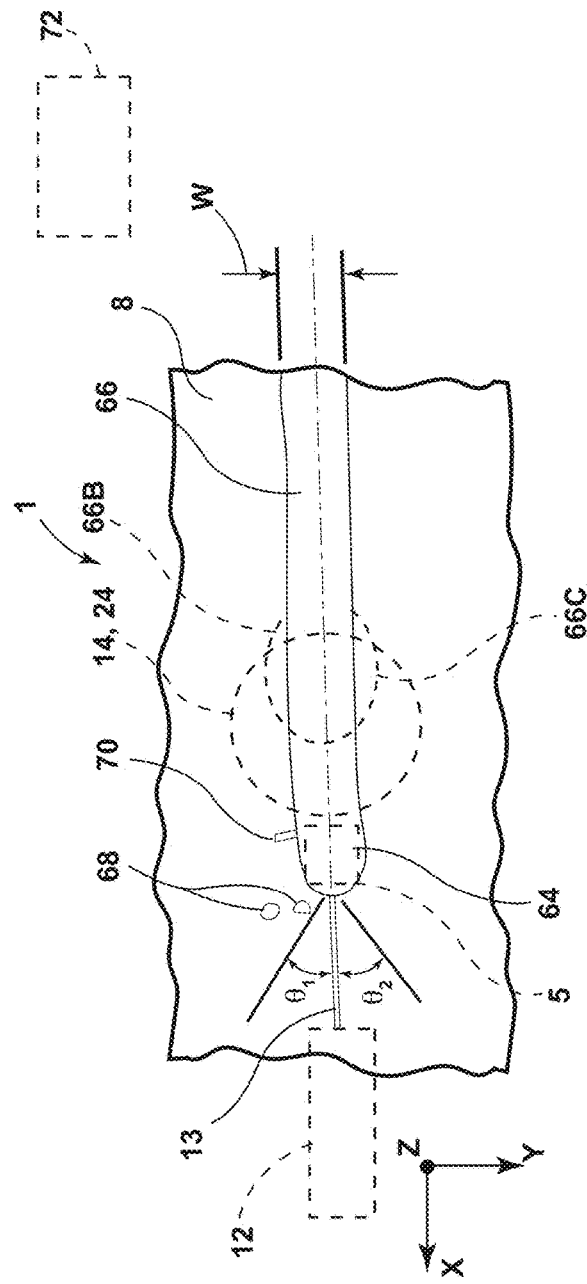
FIG. 8
FIG. 9

PROCESS CONTROL OF ELECTRON BEAM WIRE ADDITIVE MANUFACTURING

CROSS-REFERENCE TO RELATED PATENT APPLICATION

This patent application claims the benefit of and priority to U.S. Provisional Application No. 62/323,355, filed on Apr. 15, 2016, titled "APPARATUS AND METHOD FOR DETECTING FLAWS AND FEATURES FOR PROCESS CONTROL OF ELECTRON BEAM WIRE ADDITIVE MANUFACTURING," the entire contents of which is hereby incorporated by reference in its entirety.

STATEMENT REGARDING FEDERALLY SPONSORED RESEARCH OR DEVELOPMENT

The invention described herein was made in the performance of work under a NASA contract and by employees of the United States Government and is subject to the provisions of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore.

BACKGROUND OF THE INVENTION

Various additive manufacturing technologies have been developed. One such technology is Electron Beam Freeform Fabrication (EBF$^3$). The EBF$^3$ process can be utilized to build complex, near-net-shape parts requiring substantially less raw material and finish machining than traditional manufacturing methods. It is envisioned that EBF$^3$ may be utilized to manufacture a wide range of components such as metallic aerostructures and spare parts, tools, or structural elements. These parts span a wide range of scale and material choices ranging from small, detailed aluminum parts to large, near-net-shape superalloy components for rocket motors.

EBF$^3$ devices and processes are described in U.S. Pat. Nos. 8,452,073 and 8,344,281, and U.S. Patent Publication Nos. 2015/0258626, 2010/0270274, and 2010/0260410. However, known additive manufacturing processes may suffer from various drawbacks.

BRIEF SUMMARY OF THE INVENTION

One aspect of the present disclosure is a method of controlling operation of an electron beam gun and wire feeder during a deposition process in which pools of molten matter (e.g. metal) are deposited onto a substrate. Beads upon solidification of the molten matter. The method includes providing a substrate and a wire source. A molten pool of liquid phase metal is formed on the substrate by melting wire utilizing an electron beam generated by an electron beam gun. The liquid metal solidifies into a solid phase. A sensor is utilized to generate data related to at least one of a thermal transient, one or more alloy physical properties and/or melting range, a width and/or shape of the molten pool, tracking of the wire and/or the molten pool and flaws in the solidified metal. A process parameter is adjusted based, at least in part, on the data generated by the sensor. The sensor data may be generated at speeds of about 1 Hz or more or about 5 Hz or more and the process may be adjusted at speeds of about 10 Hz or more or about 20 Hz or more.

The method may include changing a raster pattern of the wire source and/or electron beam to deflect ahead, back, or to the side to spread heat. The raster pattern may be adjusted at speeds of about 10 Hz or more or about 20 Hz or more.

The method may also include detecting/tracking molten pool size and shape to detect increases and/or decreases in molten pool size, wherein the molten pool size comprises one or more of pool width, length, aspect ratio, area, centroid and reducing power of the electron beam gun to reduce molten pool size, or to detect decreases in molten pool size, and increasing power of the electron beam gun to increase molten pool size.

The process may include detecting changing thermal patterns that result in different bead geometries and/or microstructures and increasing or reducing power of the electron beam gun to increase or reduce molten pool size to correct bead geometries and/or microstructures.

The method may also include detecting a melting temperature of the molten matter (e.g. metal), and providing sufficient power, travel speed, and/or feed rate to melt the wire.

The method may include detecting dealloying in molten matter (e.g. metal), and reducing a power of the electron beam and/or increasing travel speed of the electron beam and/or changing beam focus to reduce the temperature of the molten matter (e.g. metal).

The method may include detecting viscosity of the molten matter (e.g. metal) and changing beam angle relative to the molten pool and/or wire entry angle relative to the molten pool.

The method may also include detecting a surface tension of the molten pool, and changing beam angle relative to the molten pool and/or wire entry angle relative to the molten pool to reduce surface tension.

The method may also include detecting excessive or deficient height and/or width of a molten pool at a start, and adjusting timing of one or more of a starting beam power, a travel speed, and a wire feed rate to reduce or increase height and/or width of the molten pool.

The method may also include detecting narrowing or widening of a solidified deposit, and adjusting one or more of a beam power, a beam raster, a travel speed, and a wire feed rate to increase or decrease the width of the solidified deposit.

The process may also include detecting variations in one or more of a deposit height, a width, and a shape at a stop location, and adjusting one more of a beam power, a travel speed and a wire feed rate to provide uniform height and/or width and/or shape.

The method may also include detecting variations in one or more of solidified deposit width and height due to abrupt changes in build direction, and adjusting one or more of a beam power, a beam raster, a travel speed, and a wire feed rate to reduce variations in at least one of a deposit width and a height.

The process may also include detecting incomplete wire melting, and providing beam focus and deflection up the wire to preheat the wire and/or preheating the wire via a separate heater, and/or reducing a wire feed rate and/or switching to a smaller diameter wire.

The process may also include detecting dripping of melted wire, and increasing a wire feed rate and/or decreasing a beam power and/or increasing a travel speed of the wire source and/or changing (e.g. decreasing) a wire feed height distance.

The process may also include detecting stabbing and/or wire dragging, and decreasing a wire feed rate and/or increasing a beam power and/or decreasing a travel speed of the wire feeder and/or changing (e.g. increasing) a wire feed height distance.

The process may include detecting one or more of residual stress, curvature, or twist in the wire as it is fed into the molten pool, and providing beam deflection up the wire to redirect the wire into the molten pool.

The process may also include detecting if the wire does not enter the molten pool at a desired (correct) location, and adjusting a position of the wire feeder relative to the molten pool and/or halting the process if wire is detected outside the molten pool.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 8 is a partially schematic fragmentary cross-sectional view showing $EBF^3$ operation; and FIG. 9 is a partially schematic fragmentary top plan view showing $EBF^3$ operation.

DETAILED DESCRIPTION OF THE INVENTION

Figure 1B:
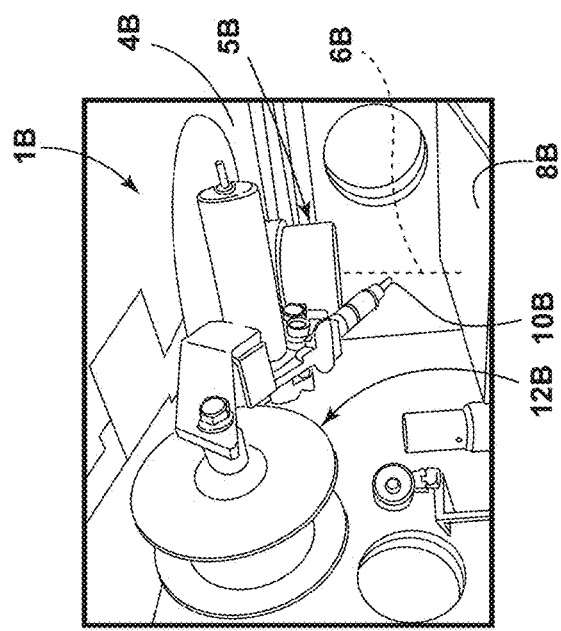
FIG. 1B is a partially fragmentary perspective view of a first portable $EBF^3$ system.
Figure 1C:
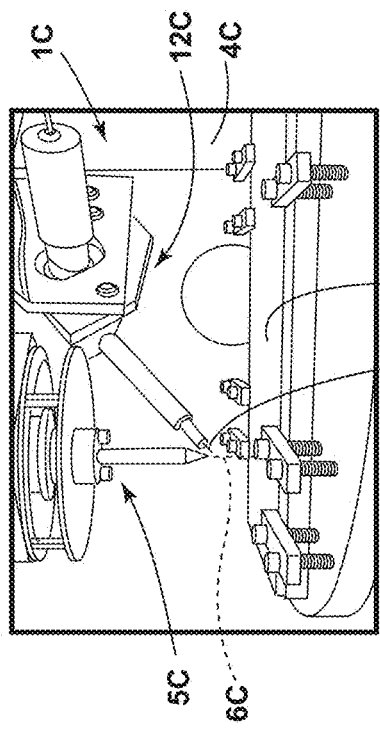
FIG. 1C is a partially fragmentary perspective view of a second portable $EBF^3$ system.
Figure 1A:
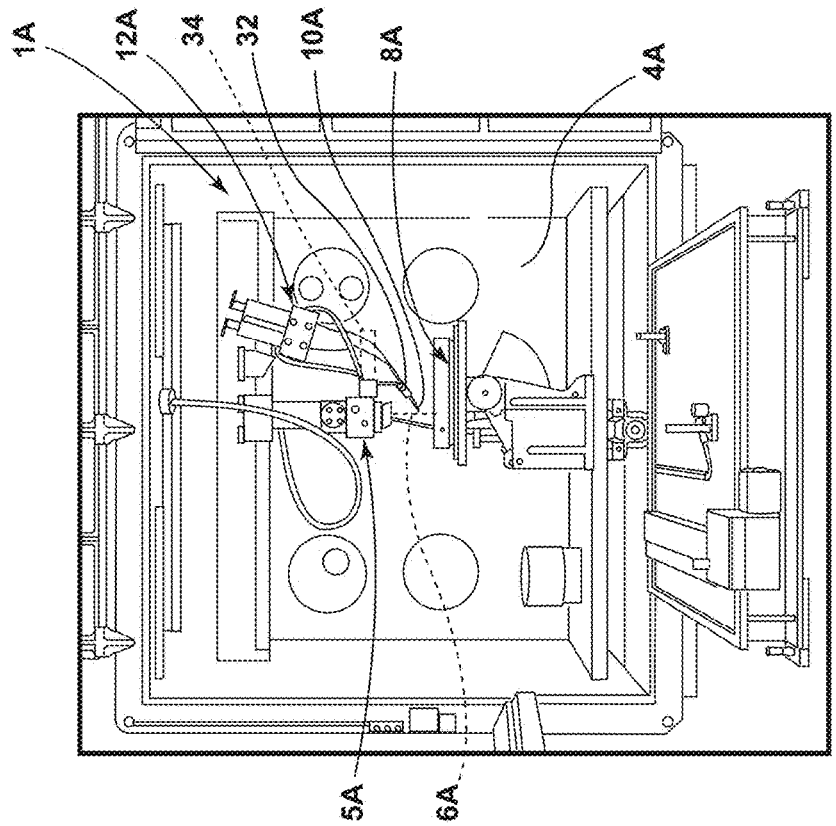
FIG. 1A is a partially fragmentary perspective view of a large $EBF^3$ system that includes a Sciaky electron beam welder.

For purposes of description herein, the terms "upper," "lower," "right," "left," "rear," "front," "vertical," "horizontal," and derivatives thereof shall relate to the invention as oriented in FIGS. 1A, 1B, and 1C. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A first $EBF^3$ machine 1A is shown in FIG. 1A, a second $EBF^3$ machine 1B is shown in FIG. 1B, and a third $EBF^3$ machine 1C is shown in FIG. 1C. Machine 1A is based upon a commercially available 42 kW Sciaky electron beam welder, and machines 1B and 1C comprise "portable" systems designed for $EBF^3$ flight experiments. FIGS. 1A-1C show the interiors of the processing chambers of the three $EBF^3$ machines 1A, 1B, and 1C, respectively. For relative size comparison, the working volume (i.e., volume accessible by both the electron beam and wire feeder) of the large Sciaky machine 1A is approximately 0.75 meters×1 meters×2 meters, while the two portable machines 1B, 1C each have working volumes of about 0.3 cubic meters. The large machine 1A accepts wire spools containing up to about 15 kg of material, while the smaller machines 1B and 1C use standard 0.5 kg wire spools. The large system 1A weighs approximately 50,000 kg, while the portable systems 1B and 1C each weigh about 900 kg ready to operate.

The operational concept of the $EBF^3$ process is to build a near-net-shape metal part directly from a CAD file in a layer-additive manner without the need for molds or tooling dies. In this process, an electron gun 5A, 5B, 5C generates an electron beam 6A, 6B, 6C, respectively that is used as a heat source to create a small molten pool on a substrate (e.g. baseplates 8A, 8B, 8C, respectively) into which wire 10A, 10B, 10C from a wire feeder 12A, 12B, 12C, respectively is fed. The substrate (baseplate) can be composed of identical or different material than the deposited metal depending upon the application. The electron beam 6A, 6B, 6C and wire feed assembly 12A, 12B, 12C, respectively are translated with respect to the baseplate 8A, 8B, 8C, respectively to follow a predetermined tool path, similar to conventional computer-aided machining practice. The deposited material solidifies immediately after the electron beam 6A, 6B, 6C has passed, having sufficient structural strength to support itself. This process is repeated in a layer-wise fashion, resulting in a near-net-shape part requiring minimal finish machining. Careful attention to process control minimizes transient thermal effects, such as distortion, until the part cools and the part can be removed from the vacuum chamber 4A, 4B, or 4C.

$EBF^3$ offers several unique attributes among the competing metallic additive manufacturing approaches. First, it is scalable in size and deposition rate, allowing fabrication of parts measuring a few cubic centimeters up to parts 1 cubic meter or larger, restricted only by the size of the vacuum chamber. High deposition rates with larger bead sizes enable near-net-shape construction of large structures using established aerospace alloys such as aluminum 2219 and 6061, stainless steel 304 and 316, Inconel® 625 and 718, and titanium Ti-6A1-4V. Second, $EBF^3$ uses wire feedstock as opposed to metal powder for high feedstock usage efficiencies and safe operability in reduced gravity environments such as low-Earth orbit. Third, the electron beam used to melt the metal wire requires that the process be conducted in a vacuum chamber; vacuum enables processing of traditional aerospace alloys, most of which cannot be melted in air without oxidation degrading their metallurgical properties. Finally, EBF³ offers the promise of fabrication of structures with functionally graded metallurgy. By selectively introducing wires of different compositions during the deposition process, the chemistry and resulting physical properties of the metal structure can be varied continuously throughout the part and tailored to its exact service requirements.

While the basic operational concept of EBF³ is simple, a closer look reveals dozens of variables, each affecting the outcome and many of which are interdependent. As discussed in more detail below, there are several major challenges to the acquisition and use of real-time sensor data to monitor and control the process. One aspect of the present disclosure is the use of imaging techniques and data analyses to detect anomalies and refine the EBF3 process through real-time monitoring and control to mitigate these challenges.

The first major challenge to sensor integration into the EBF³ process is the deposition environment itself. Efficient generation and transmission of the electron beam requires high vacuum ($10^{-5}$ Torr or lower), meaning that sensor electronics in the chamber must (preferably) be vacuum-rated. This implies little or no permissible outgassing from electronics or packaging and the ability to run uncooled or with conductive and radiative cooling only. Unlike vacuum processes such as electron microscopy, EBF³ is a relatively "dirty" process that results in metal vapor contamination of line-of-sight surfaces inside the vacuum chamber. Unprotected optical surfaces such as lenses or mirrors will become coated with metal vapor that will periodically need to be removed. Translation of the part and/or electron beam gun during part fabrication results in a moving molten pool that is difficult to track unless sensors are incorporated into the electron beam gun carriage. The size of the electron beam gun and the gun-to-work distance also place practical limits on the size and placement of cameras or other sensors.

Second, EBF³ is an inherently thermally transient process. Several factors contribute to this, beginning with its layer-additive nature. The continuously moving molten pool over a relatively cold baseplate or previous layer encounters a different cooling path and thermal mass with each successive layer. Variations in the geometry of the part such as section thickness changes, ends or corners also contribute to these changes. Thermal transients need to be better managed to enable repeatability necessary for certification of additive manufacturing processes for use in many applications. Therefore, sensors capable of measuring thermal distributions are important for tracking changes in the molten pool (by detecting the thermal gradients between liquid and solid phases) over time.

Third, the physical properties of each metal alloy (e.g., specific heat, melting temperature, thermal conductivity, vapor pressure) necessitate different process parameters such as beam power, beam raster, wire feed rate and translation speed. Factors of 2×-10× difference depending upon the material and part geometry are not uncommon, often requiring equally wideband sensors. Less obvious are process accommodations arising from material properties such as molten pool surface tension and liquid metal viscosity, which affect the shape and behavior of the molten pool during deposition. Differing vapor pressures of various alloying additions can result in selective de-alloying (constituent loss) in the deposited material. Controlling the temperature of the EBF³ process has been shown to impact alloy compositional losses. The temperature-dependent variation of emissivity also affects thermal imaging, requiring unique sensor calibrations and camera settings to optimize the imaging. While emissivity is well documented for many pure metals and common engineering alloys, it is not generally known for functionally graded materials deposited with EBF³. Since it is of interest to use EBF³ to deposit materials with widely varying physical properties, wideband sensors capable of detecting the thermal environment for low melting temperature alloys like aluminum up to high melting temperature alloys like nickel are more versatile.

The fourth challenge involves geometric variations in the deposit that result from imperfect coordination of heat and mass flow (electron beam power and wire feed) during starts, stops and abrupt changes in build direction. These variations include bulbs (build-up of excess material at starts), necking (narrowing of the deposit) or tailing-off (deficit in deposit height approaching a stop). Although bead widths are affected with each of these variations, the more significant impact is on the height of the deposited material. Since the EBF³ process is a layer-additive process, even minute perturbations in height accumulate and cause large errors over time as the build progresses. Even parts measuring as small as 10 cm in height can represent over 100 layers. Therefore, the sensor type and its location in the build chamber preferably provide precise measurement of the bead height.

The closely related fifth challenge involves the relative direction of wire in-feed and deposit direction to the geometric variations in the deposit. Changes in the wire orientation with respect to the translation direction (e.g., wire lagging or pushing the molten pool, or entering from the side) and wire elevation (e.g., entry angle relative to the horizontal) can subtly change the geometry of the deposit. Equally important, fabrication of some parts may require multiple side-by-side beads to develop the required section width, and the shape of the molten pool depends upon the presence and relative location of adjacent beads. For example, for multi-bead deposits it is often easier to "push into" adjacent beads than to reach over them but this is not always possible due to other constraints. If the width of the bead and the influence of the wire on the molten pool can be measured in real-time, minor adjustments to processing parameters such as wire feed rate and translation speed can be implemented to improve part precision.

Sixth, random process errors result from variability in the wire feed. The wire is primarily at room temperature until it crosses into the electron beam path, at which point it is subjected to an abrupt thermal gradient, melting over a very short distance as it enters the molten pool. Larger diameter wire, therefore, retains substantial stiffness as it enters the molten pool, potentially resulting in several errors. In the event of excess heat, insufficient wire feed, or wire feeding above the electron beam/substrate intersection point, dripping may occur. Conversely, insufficient heat, excess wire feed, or wire feeding below the electron beam/substrate intersection point may result in "wire stabbing" which can cause the wire to oscillate back and forth in the molten pool; skip, causing fluctuations in the deposit height; or deflect off the bottom of the molten pool and divert out of the beam altogether. Improper wire location or poor timing of the start/stop sequence will often result in wire sticking through the welds. Some errors of this nature have also been observed due to cast (residual curvature or twist in the wire not removed by the wire straightener) or simple mechanical misalignment of the wire feed apparatus that was not immediately apparent. To measure wire feed anomalies, it may be beneficial to track wire position relative to the molten pool. This may require a sensor with a wider field of view and the ability to measure geometric features that have widely different temperatures.

A seventh major challenge is encapsulation of flaws within the EBF$^3$ deposits. Voids and porosity have been observed due to contamination (cleanliness) of the wire, wire variability, or programming errors in the steps between side-by-side beads and layers. Inclusions can occur when the molten pool picks up a contaminant from contaminated wire or from metal vapor condensate flaking off and falling into the deposit. Lack of fusion between layers can occur due to insufficient heating before or during the deposition steps, improper programming of the layer height, or oxidized surfaces when the part has been exposed to air prior to initiating or resuming interrupted EBF$^3$ deposition. Similar to welding operations, hot cracking or quench cracking can occur due to high thermal gradients, insufficient preheat or microsegregation that occurs with rapid cooling. Material property variations can also occur due to microstructural or chemical variations. For example some alloys will form strong textural orientation due to preferential crystallographic freezing that follows the cooling path. Finally, large thermal gradients and thermal contraction can result in residual stresses that will manifest as distortion, or in the extreme case, cracking. These defects and the mechanisms to control and avoid their formation are somewhat understood.

The ability to detect, quantify and repair flaws that occur during the EBF$^3$ deposition process is beneficial. Evaluating thermal diffusivity using thermal imaging cameras is one way to detect embedded flaws during deposition.

The solution to these challenges resides in integration of imaging systems into the EBF$^3$ systems to monitor the process. Image analyses to identify the anomalies and control logic to implement corrective action are then required to fully close the processing control loop.

Internal Mount CMOS Camera

Initial NIR imaging approaches to monitoring the molten pool during the EBF$^3$ process were investigated from 2003 to 2005. The first camera selected was from Silicon Imaging, model SI-1280. This is a 12-bit, digital Complementary Metal-Oxide Semiconductor (CMOS) camera, which has particular advantages for the EBF$^3$ process environment. Data is digitized in the camera reducing the susceptibility of signals to noise in transmission lines. CMOS cameras directly measure the current in the detector so there is no charge build-up in the pixel wells as in a Charged Coupled Device (CCD). Therefore CMOS cameras will not bloom or streak when overexposed. For example, if the electron beam energy density is too high, the resulting plasma would "wash out" a normal CCD camera, preventing viewing of the molten pool. A CMOS sensor will simply "peg out" a pixel at its maximum value, leaving adjacent pixels unaffected. The exposure was controlled through a LabView Camera Link interface. This camera has a 1.28 megapixel chip, but can be operated with a smaller region of interest at very high speeds. At 100×100 pixels, frame rates of 3000 fps can be achieved.

The CMOS camera consumes very low power, producing less heat and reducing the need for cooling in the vacuum environment. A water-cooled coldplate was installed against the camera body for precautionary measures, but the camera also operated for short periods of time without overheating in the vacuum environment without the coldplate. The compact design of this camera (45×52×50 mm) enabled installation on a bracket directly on the electron beam gun. Pinhole and secondary optics were installed with a flow controller to meter argon into the camera/pinhole system to protect the optics from being occluded by metal vapor. This optical camera was bandpass filtered down to the NIR range and calibrated to provide thermal information.

Figure 2A:
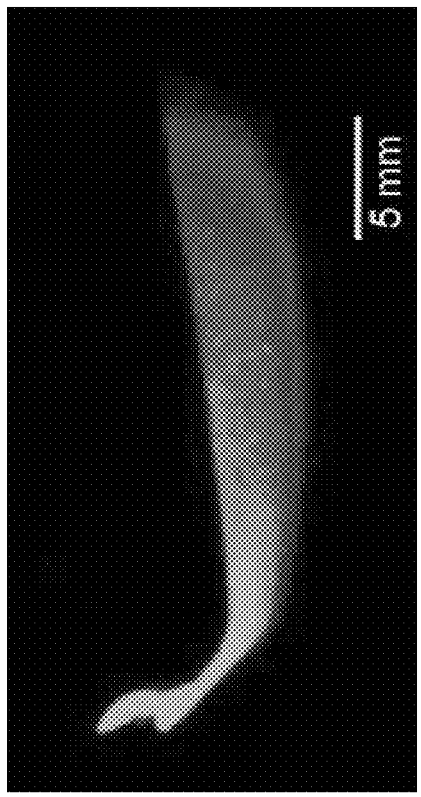
FIG. 2A is an NIR image from a side-mounted orientation.
Figure 2B:
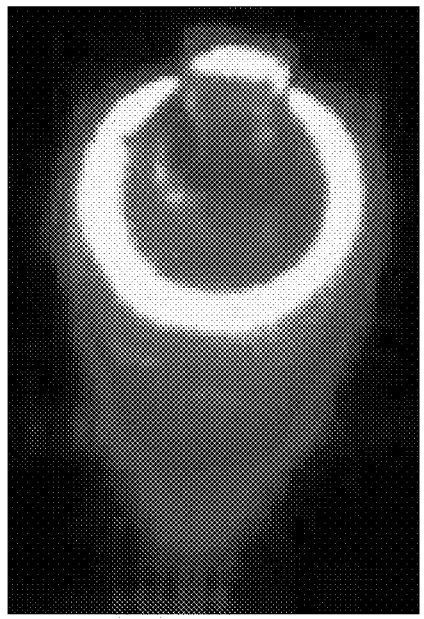
FIG. 2B is an NIR image from a downward angle-mounted orientation.
Figure 2C:
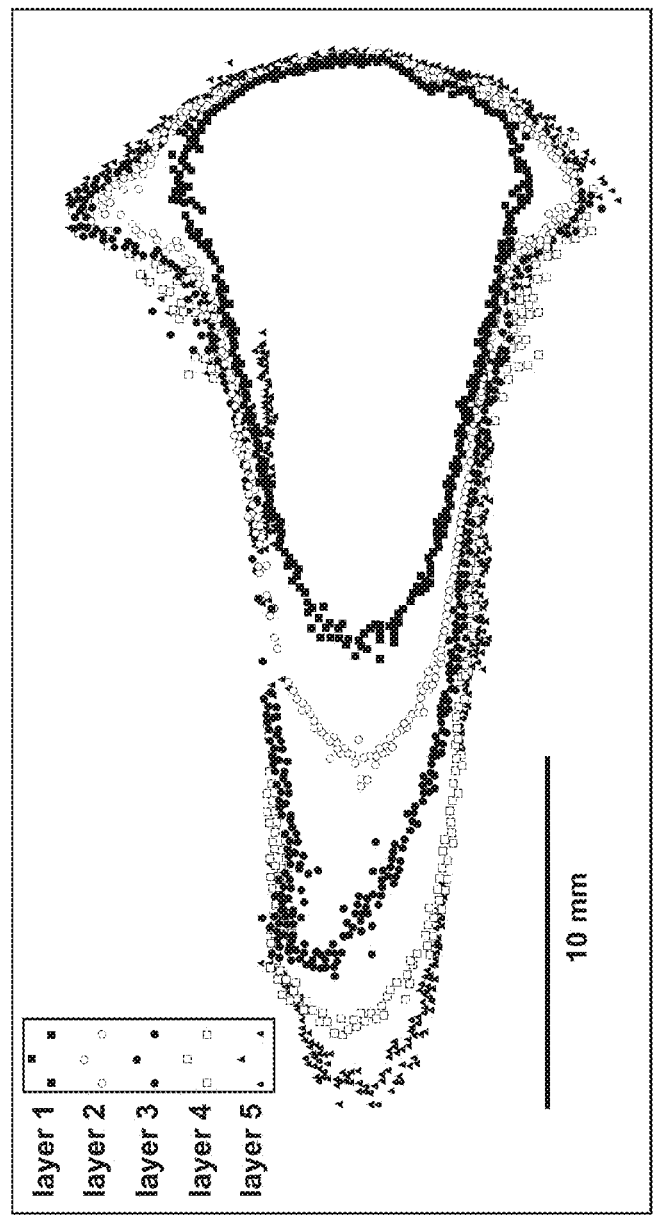
FIG. 2C is a chart of thermal molten pool data from 5 sequential layers showing thermal transients.

FIGS. 2A and 2B show data from the Silicon Imaging camera on Ti-6A1-4V. The color scale in FIGS. 2A and 2B was calibrated to show the Ti-6A1-4V liquidus temperature as light orange, and the solidus temperature as blue. The camera was installed in two different locations attached to the electron beam gun: orthogonal to the wire feeder with a wider field of view to capture height and cooling path data (FIG. 2A), and opposite the wire feeder focused down on the molten pool to capture molten pool shape and size (FIG. 2B). A series of experiments on Ti-6A1-4V was performed, depositing five successive layers on a deposit 25 cm in length, and a single bead width. The solidus temperature was outlined based on analysis of the thermal images. After five layers, the length of the molten zone doubled at constant power and travel speed, illustrating the dependence of the process on geometry and thermal history (FIG. 2C). The goal in using these data is to adjust process parameters to maintain a constant tail length and thus cooling rate.

Fiber Optic+External Mount CCD Camera

Although the CMOS camera has high speed data acquisition, good compatibility with the vacuum environment, and resistance to blooming of oversaturated pixels to adjacent pixels, the resolution and low light capabilities were inferior to CCD cameras in the 2003 to 2005 time period. For comparison, the second camera evaluated at that time was a Hamamatsu C8484-05 12-bit CCD 14 (FIGS. 3A, 3B) with a 1.37 megapixel chip. The CCD camera 14 has excellent NIR characteristics and operates at low light levels. The camera 14 was also programmed through the LabView Camera Link interface.

Figure 3A:
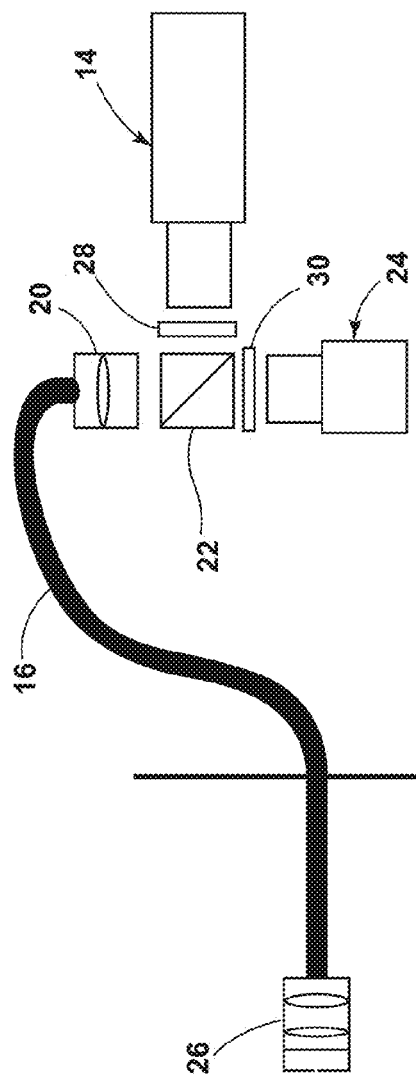
FIG. 3A is a schematic of a camera installation in an $EBF^3$ system.
Figure 3B:
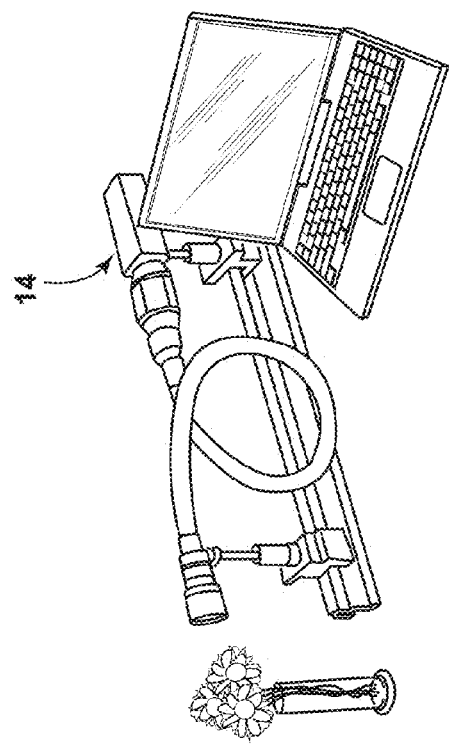
FIG. 3B is a perspective view of a bench set-up with Schott fiber optics and Hamamatsu camera.
Figure 3C:
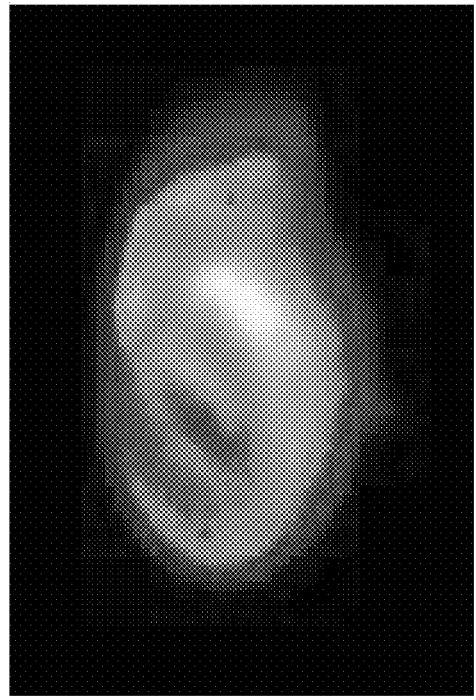
FIG. 3C is an NIR image from a downward angle-mounted orientation.

The Hamamatsu camera 14 was too large to mount on the electron beam gun and was not well adapted to the vacuum environment. With reference to FIG. 3A, this set-up relied on fiber optic transmission of images from a pinhole and imaging optics 26 via a Schott wound image bundle. The fiber bundle 16 passes out of vacuum chamber 18 to a relay lens 20 and beam splitter 22, and the image was monitored by two cameras, a Silicon Imaging SI-1280 24 and a Hamamatsu C8484-05 14. Each camera has its own relay lens, so magnifications could be independently adjusted. The optical/NIR filters 28, 30 are accessible without opening the vacuum chamber 18. The coherent fiber bundle 16 from Schott has transmission out to 1.2 microns (the IR limit of the imaging sensors) and about 800,000 fibers (or pixels). This configuration offers flexibility for process diagnostics. For example, the SI-1280 camera 24 may be run at very high frame rate for real-time process sensing, and the Hamamatsu camera 14 may be run at a slower frame rate with a larger field of view for spatial resolution in the process area and detection of the wire feed position. Filters may be used to monitor in the NIR range with the CCD camera 14, and very short shutter speeds may be used to control high intensity light emanating from the molten pool. This provides thermal details in the molten pool (FIG. 3C), but due to the short shutter speed and losses from the fiber optic bundle 16, thermal data in the surrounding areas were lost. The camera was not permanently integrated due to damage sustained to the Schott fiber optic bundle 16, as a result of fibers shifting with the moving electron beam gun and vacuum. The ends of the fiber optic bundle 16 could be redressed, but was not pursued.

Backscattered Electron (BSE) Detector

From mid-2008 to mid-2009 an effort was made to develop an electron imaging system that could be used to actively monitor and measure the EBF$^3$ deposit height and wire position relative to the beam. Additional objectives of this work were to explore the capabilities of the electron beam gun system to raster the beam at relatively high frequency in specific patterns to preferentially direct energy to the wire or the molten pool, and to detect the onset of process errors due to wire feed errors or misalignment.

Normal operation of the EBF$^3$ electron beam generates large quantities of primary electrons, secondary electrons, x-rays, neutral particles, ions and backscattered electrons, all with a wide range of energies. Of these possible signal sources, backscattered electrons (BSEs) were chosen because of their directionality and high retained energy fraction. A custom-built BSE detector 34 (FIG. 1A) was purchased from ETP-Semra in Australia and installed in the large EBF$^3$ vacuum chamber 4A (FIG. 1A). In order to improve the signal-to-noise ratio (i.e., to capture only those scattered from the molten pool), a series of negatively-biased screening electrodes were placed at the entrance to the detector. BSEs of sufficient energy to transit the screening stages enter the detector and strike a phosphor screen, generating photons which travel through a light pipe to a photomultiplier tube. Output from the photomultiplier tube is then used to construct an image of the target area.

Several different mounting arrangements for the detector 34 were tried with varying degrees of success for producing an unobstructed view of the EBF$^3$ process zone without exposing the sensor to metal vapor. The best viewing angle was ultimately obtained with the detector mounted directly in line with the wire feed nozzle 32 (FIG. 1A) at an elevation angle of about 15° above the workpiece (baseplate 8A). As with the optical/NIR cameras, the sensor 34 was also susceptible to metal vapor contamination.

Some high quality images were obtained with the BSE detector 34; however, these images were obtained with very low beam current (1-5 mA) and a raster scan pattern specifically designed for imaging, not deposition. In other words, images of this type could not be obtained using the beam parameters in real time during an actual build; imaging scans would have to be conducted separate from the build process. Also, during the build process the beam path is confined to the molten pool and not rastered outside a very small target area. It was possible to infer, but not directly measure, the deposit height with a single BSE detector. The efforts to monitor wire position and preferentially direct beam energy into the wire or the molten pool with the BSE detector were quite successful, and revealed that some information as to geometric error conditions (dripping, wire feeding off-center to the molten pool) could easily be detected.

Despite these promising results, BSE imaging was ultimately abandoned as a means to provide information to the closed-loop control system. This was mainly due to its relatively high cost and the bulkiness of the detector system. In addition, the BSE detector required modification of the electron beam rastering and focusing coils to coordinate the beam location with the sensors in the detector. As a research and development tool, the BSE detector was useful, but challenges with obtaining images during beam power and raster patterns typical for deposition, and the ability to image but not measure temperatures led to the decision to explore other sensors.

Internal Mount CCD Camera

It was learned from the experiences described above that camera location may be important for observation of the molten pool sufficient to provide data usable for closed-loop control of the process.

Figure 4B:
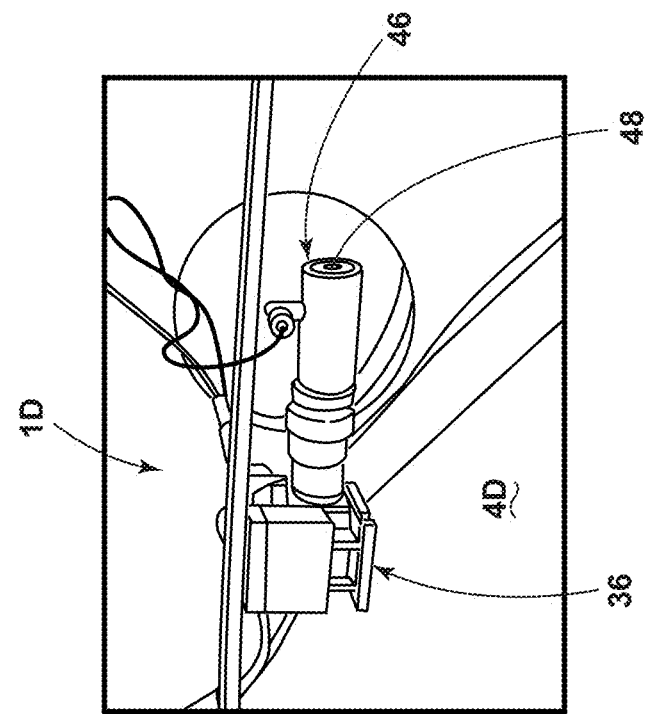
FIG. 4B is a partially fragmentary perspective view of an NIR camera and gas shield installation in an $EBF^3$ system.
Figure 4A:
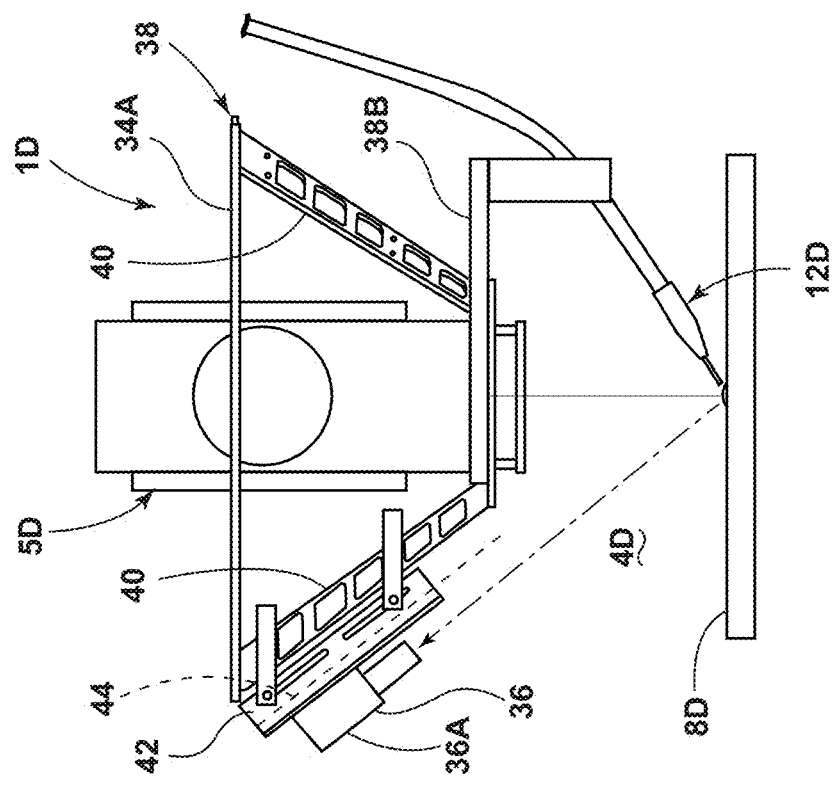
FIG. 4A is a schematic diagram of a CCD camera mounting ring and optical path in an $EBF^3$ system.

With reference to FIG. 4A, a miniature CCD camera 36 (a Prosilica GC1380H) may be utilized in an EBF$^3$ system 10. In order to optimize the image and provide future additional capabilities, an instrumentation ring 38 may be attached to the electron beam gun 5D. The instrumentation ring 38 provides the ability to position cameras and other hardware in nearly any location around the gun 5D. The instrumentation ring 38 includes upper and lower rings 38A, 38B with diagonal struts 40 connecting the upper and lower rings 38A, 38B. The cameras (or other instrumentation) may be adjustably attached to the diagonal struts 40 with sliding brackets 42. The diagonal struts 40 allow the cameras to be moved to any position around the electron beam gun 5D. The slide brackets 42 allow the pitch angle of the camera to be modified/adjusted. Two cameras may be utilized to image the melt pool at 180° and 90° from wire feeder 12D.

The NIR band was selected to image metals of higher melting temperatures such as 316 stainless steel, Ti-6A1-4V, and Inconel® 625. The Prosilica GC1380H camera 42 is a non-cooled CCD camera with a frame rate of 30 Hz at full resolution through a GigE interface. A water-cooled cold-plate 44 was installed against the camera body 36A to provide cooling in the vacuum environment of vacuum chamber 4D. The camera pixel array size is 1360×1024 (pixel pitch size of 6.45 μm×6.45 μm). The dynamic range of camera 42 is 12 bits. The imaging spectral band may be set at 0.875 to 1.05 μm using a long pass filter to allow imaging temperatures from 700 to approximately 2,200° C. An NIR neutral density filter may be used to reduce the transmission by a factor of 10. The C-mount optical package contains a 150-mm relay lens pair, a protective window (B270 material), and an extension tube with a gas fitting 46 (FIG. 4B). The gas fitting 46 allows for a small amount of inert gas to flow out of the 3 mm diameter aperture 48 and thus prevent window clouding due to residual metallic particles dispersed during the electron beam excitation. The resolution of camera 42 is approximately 0.006 cm/pixel.

A radiometric calibration may be utilized to convert the pixel values (intensity counts) to temperature, define the temperature imaging limits of the system, determine the optimal threshold values for closed loop control metrics (based on the wire melting temperature), correct for material dependent emissivity, and selection of the optimal integration time. A radiometric characterization was performed on the NIR camera/optic 42 using a calibrated blackbody radiation source set at various temperatures. The process involves the calibration of the radiance counts to actual temperature values. The temperature values used were 700, 800, 900, 1,000 and 1,100° C. at specified sensor integration times ranging from 10 to 50,000 μs. Using a given emissivity value, the radiance is then converted to temperature using a linear interpolation of the system's radiance response.

Figure 5A:
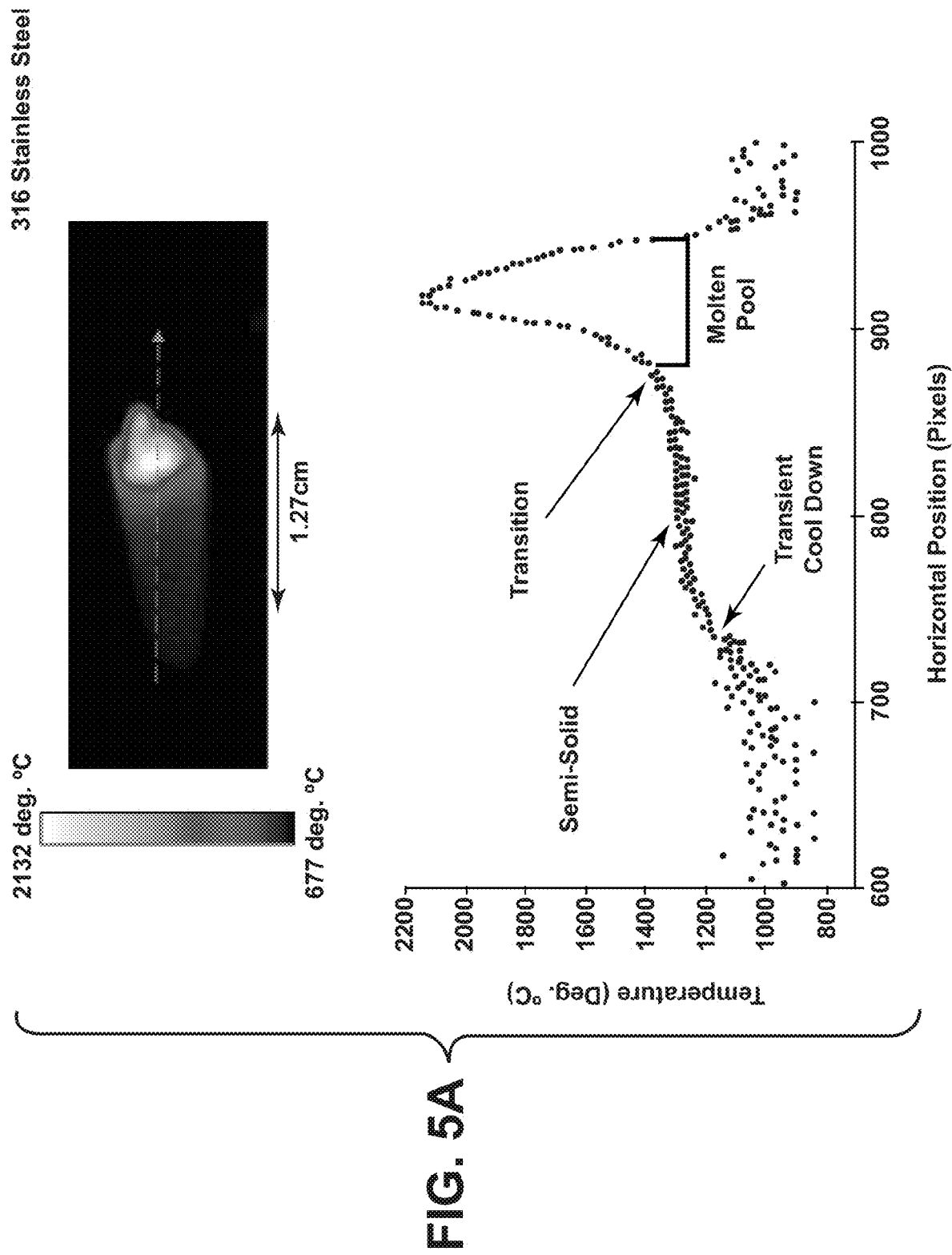
FIG. 5A is a thermal image of 316 stainless steel with line plots showing deposition temperature variation.
Figure 5B:
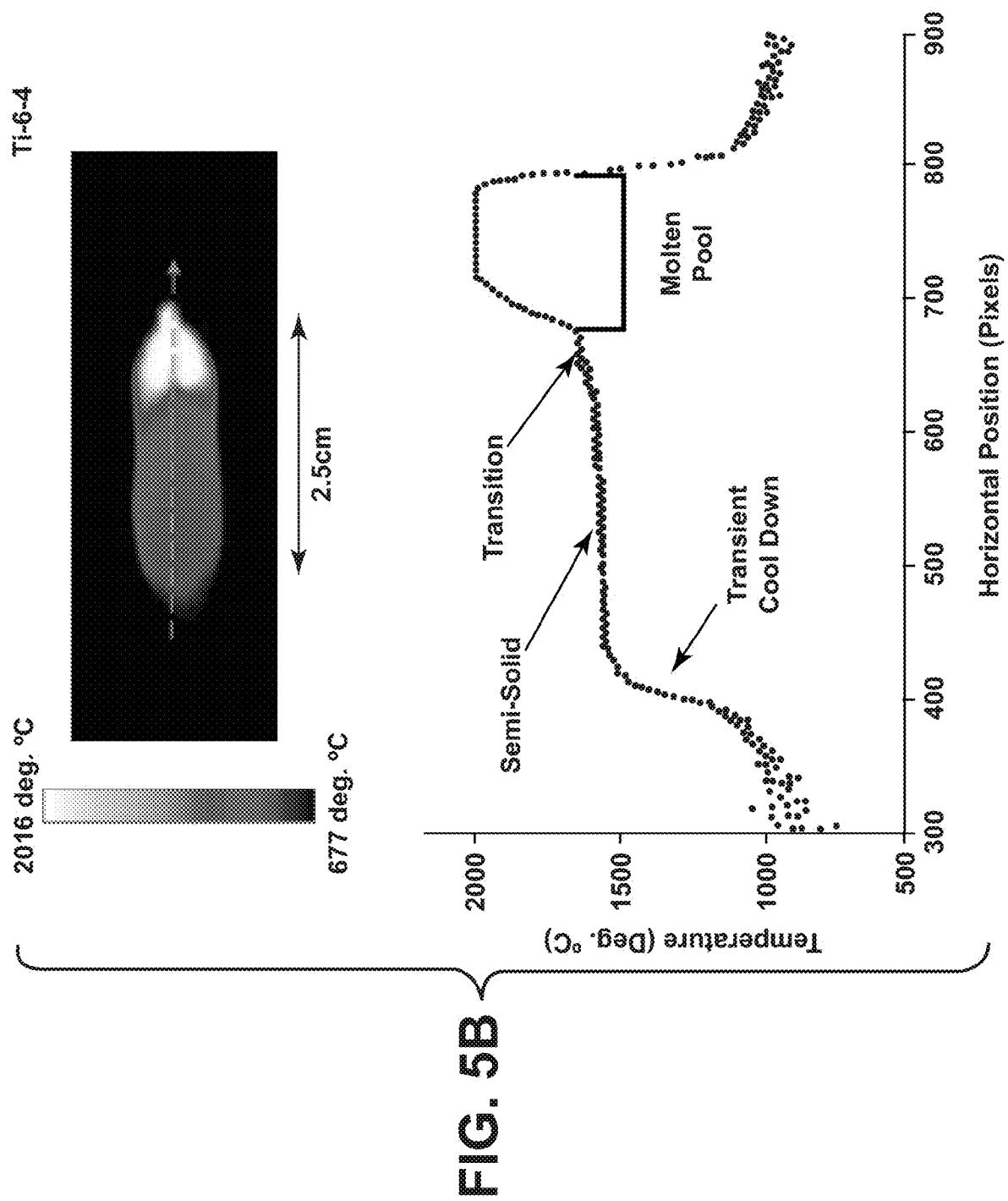
FIG. 5B is a thermal image of Ti-6A1-4V with line plots showing deposition temperature variation.
Figure 5C:
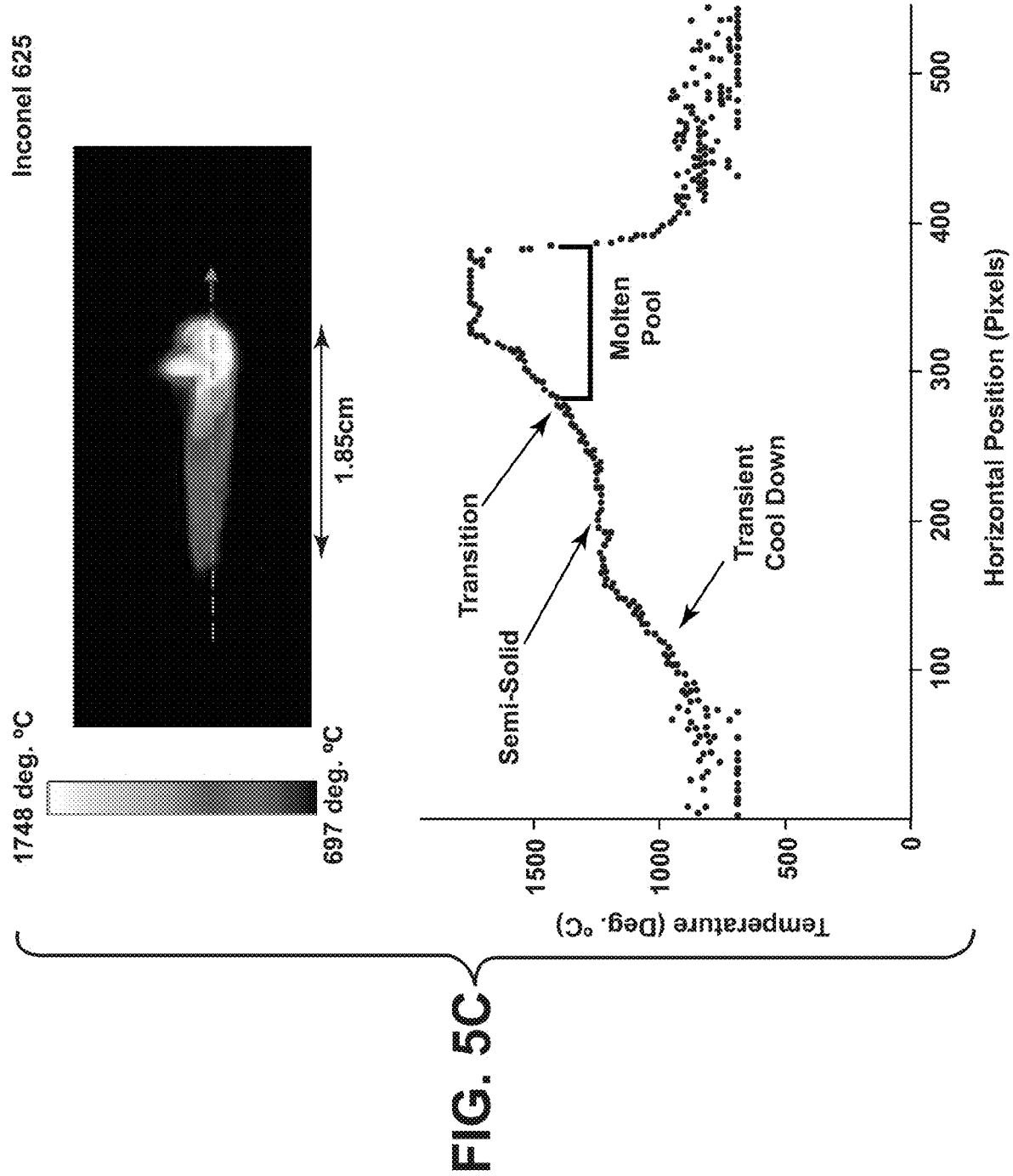
FIG. 5C is a thermal image of Inconel® 625 with line plots showing the deposition temperature variation.

FIGS. 5A-5C are NIR temperature images and line plots along the deposition of 316 stainless steel (FIG. 5A), Ti-6A1-4V (FIG. 5B), and Inconel® 625 (FIG. 5C). The 316 stainless steel temperature image was obtained using an integration time of 1500 μs and emissivity literature value of 0.66. The Ti-6A1-4V temperature image was obtained using an integration time of 1000 μs and emissivity of 0.48, and the Inconel® 625 temperature images were obtained using an integration time of 1500 μs and emissivity of 0.77. The measured temperature values agree with literature values for 316 stainless steel, Ti-6A1-4V, and Inconel® 625 at the transition point for the respective melting point ranges of 1370 to 1400° C., 1604 to 1660° C., and 1290 to 1350° C. respectively. This permits measurement of the molten pool shape and area, the semi-solid area and length, and transient cool down regions. These metrics may be used for adjusting process parameters such as beam power, beam raster, wire feed rate and traverse speed during closed loop control.

Internal Mount Short-Wave IR (SWIR) Camera

Figure 6:
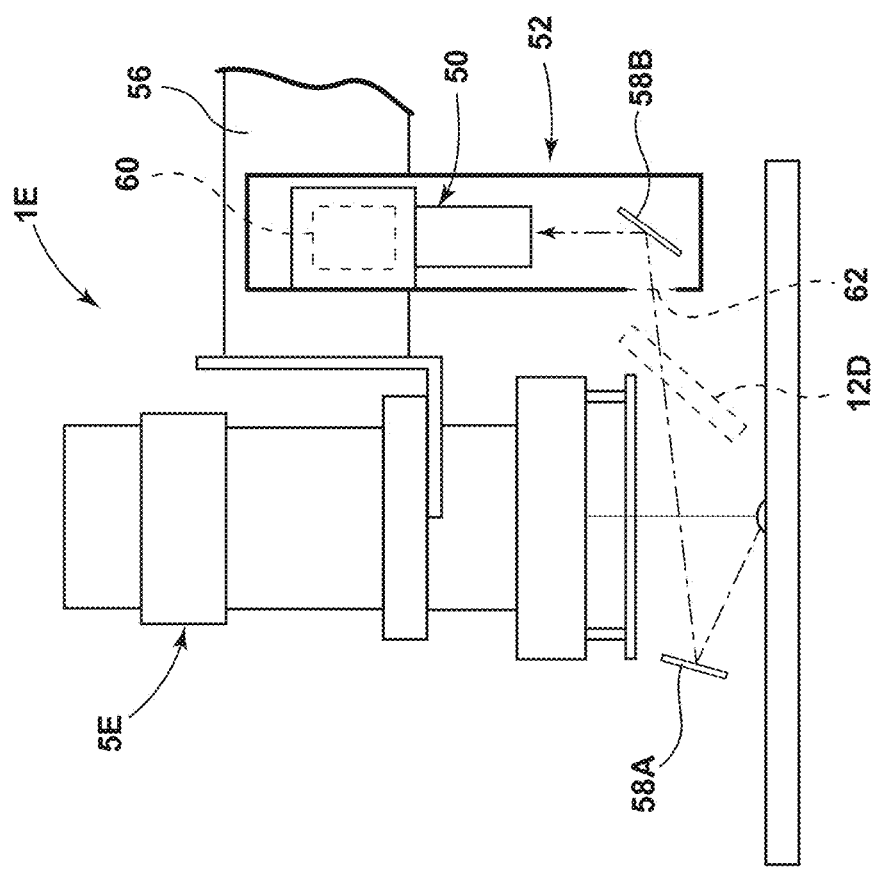
FIG. 6 is a schematic diagram of a SWIR camera mounting and optical path in a portable $EBF^3$ chamber.

Longer wavelength cameras may be utilized for imaging lower melting temperature alloys (e.g. aluminum). With reference to FIG. 6, a Short-Wave Infrared (SWIR) camera 50 may be installed in a portable $EBF^3$ system 1E. Due to the space limitations, a periscope-style camera assembly 52 was developed in order to image the molten pool. The electron beam gun 5E has a robotic arm 54 with four degrees of freedom. The camera 50 is attached to the front side 56 of the robotic arm 54 in a vertical position which does not limit the system's range of motion. Mirrors 58A and 58B direct the image to the camera 50. The SWIR camera 50 may be actively cooled by a coldplate 60 which is operably connected to an external water chiller by water lines (not shown). The SWIR camera 50 is positioned approximately 45° off the forward deposition direction (the direction to the left in FIG. 6). Due to the space limitations in this $EBF^3$ system, the system's wire feeder 12D is positioned approximately 45° off the opposite side of the robotic arm 56 (immediately behind the camera 50 in FIG. 6).

The SWIR band may be utilized to image metals of lower melting temperatures such as aluminum. The digital SWIR camera 50 may comprise an Allied Goldeye G-032. This camera requires temperature stabilization using an internal thermoelectric cooler. The camera pixel array size is 636× 508 (pixel pitch size of 25 μm×25 μm). The camera's dynamic range is 14 bits with a maximum frame rate of 100 Hz at full resolution through a GigE interface. The spectral response of the camera's detector is approximately 0.950-1.7 μm and this allowed measurement of temperatures from about 300° C. to about a 1000° C. The camera 50 may be protected within an aluminum enclosure that is liquid cooled. The camera's optic is a C-mount 50 mm lens with 75% or better transmission between 0.700 μm to 1.9 μm. A protective window comprising a Mylar® polyester film 62 may be used to protect the optical system from metal vapor resulting from the electron beam deposition process. Camera resolution is approximately 0.015 cm/pixel. With a molten pool size of 0.2 cm to 0.6 cm, this camera resolution results in the regions of interest being captured by 10's of pixels across.

A radiometric characterization may be performed using a calibrated blackbody radiation source set at various temperatures for the SWIR camera 50. The process involves the calibration of the radiance counts to actual temperature values. The temperature values used were 300, 400, 500, 550, and 600° C. at specified sensor integration times ranging from 120 to 15,000 μs.

Figure 7A:
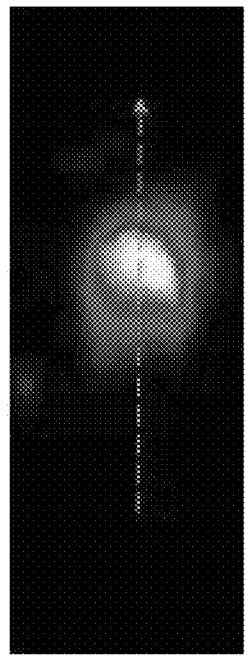
FIG. 7A is a SWIR temperature image during $EBF^3$ deposition of aluminum 2219.
Figure 7B:
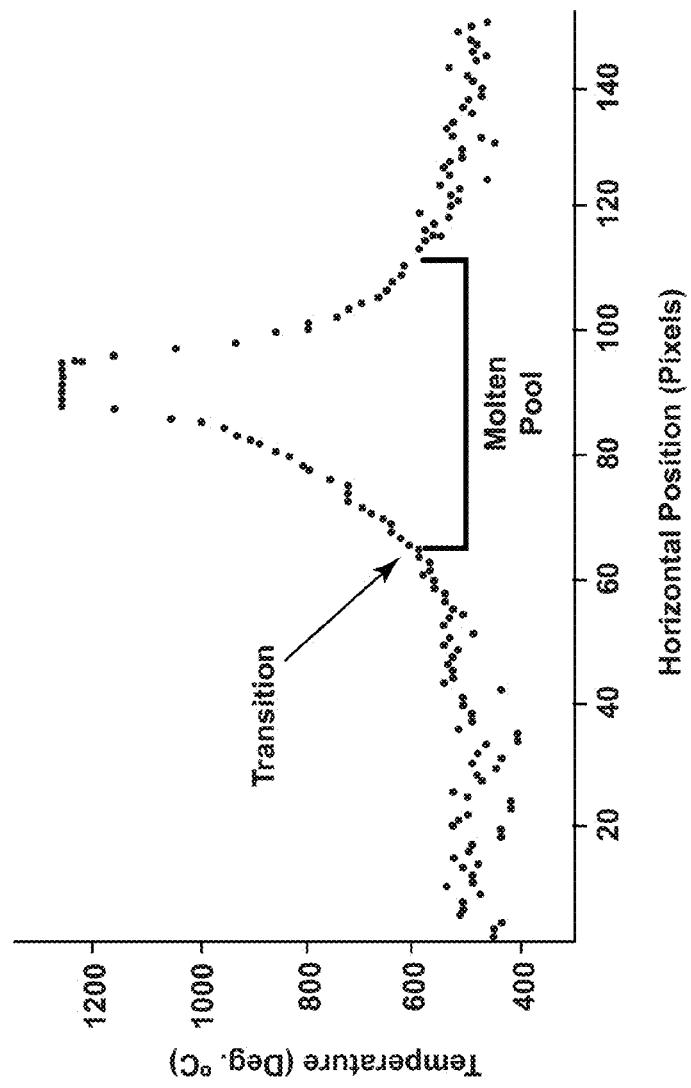
FIG. 7B is a line plot corresponding to the SWIR image of FIG. 7A.

A SWIR temperature image and line plot collected during the deposition of aluminum 2219 are shown in FIGS. 7A and 7B, respectively. The aluminum 2219 temperature image was obtained using an integration time of 200 μs and an emissivity value of 0.2. As shown on the line plot, the measured temperature values agree with aluminum 2219 literature values at the transition point for the melting point range of 543 to 643° C. This permits measurement of the molten pool shape and area, but the semi-solid and transient cool down regions were not detected for the integration time and frame rate (20 Hz) used in this example.

The vacuum, thermal, metal vapor environment and limited space in the $EBF^3$ process pose challenges for sensor selection and integration into the system for real-time process monitoring and feedback. Since $EBF^3$ is inherently a thermally transient process, thermal data are of interest to correlate with microstructural and non-destructive evaluations to identify metallurgical features and flaws that drive the mechanical properties of the deposited materials. Due to space constraints, multiple sensors may not be feasible, so sensors that can capture all of the suitable data are sought. Suitability of a particular imaging technology for use in the $EBF^3$ process is also a concern. Suitability may be determined by consideration of the available frame rate, resolution, signal-to-noise ratio, spectral response, vacuum compatibility, ruggedness, size, and cost.

FIGS. 8 and 9 generally illustrate an $EBF^3$ system 1 and provide an overview of the process. More detailed descriptions of process and controls are provided below in connection with Tables 2-8. $EBF^3$ system 1, (FIGS. 8 and 9) includes a wire feeder 12 that feeds wire 13 in the direction of the arrow A, and wire 13 is melted by a beam 6 produced by electron gun 5. The wire 13 melts as it intersects the beam 6 to form a molten pool 64 that cools and hardens to form a solid deposit 66 of solidified metal on substrate or base plate 8. Molten pool 64 and solid deposit 66 together form a bead 63. As discussed in more detail below, the process may result in a vapor or plasma plume 74. The wire feeder 12 may be positioned to feed wire 13 at an angle α1, and electron gun 5 may be positioned at an angle α2 relative to the base plate 8. The solid deposit 66 generally has a height "H" (FIG. 8) and a width "W" (FIG. 9). However, various defects in the process can lead to raised areas 66A (FIG. 8) having an increased height, and/or regions 66B or 66C having increased width (FIG. 9). It will be understood that regions (defects) having reduced height and/or width may also be formed. During the process, drops of molten material 68 and/or unmelted pieces or portions of wire 70 may be formed.

If these various defects are detected by sensors such as cameras 14 and/or 24, the wire feed rate, angle α1 and/or θ1 or θ2 (FIG. 9) may be adjusted to reduce or eliminate the development of these defects. Similarly, the angle α2 of electron beam 6 produced by electron gun 5 may be changed/adjusted. Also, the position of the electron beam may be changed as shown by the dashed line 6A (FIG. 8) to change the point at which the electron beam 6A is incident on the wire 13 and/or molten pool 64. The sensors (e.g. cameras 14 and/or 24) may be operably connected to a controller 72 that controls electron gun 5 and wire feeder 12. As shown in Tables 2-8 below, the images and other data from the sensors may be utilized by the controller 72 to continuously adjust the electron gun 5 and wire feeder 12 during operation to correct defects detected by the sensors in a closed loop control. In general, the adjustment parameters may be developed analytically and/or by testing.

During operation, the wire feeder moves in the direction X which is generally parallel to the base plate 8 at a height "HW" (FIG. 8). The electron gun 5 generally travels at the same velocity in the direction X. The height HW of the wire feeder 12 can be adjusted, and the velocity of the wire feeder 12 and/or electron gun 5 in the direction X can also be adjusted during operation. It will be understood that translation of the electron gun 5 and the wire feeder 12 is not limited to the X direction, and these components may be translated along any vector in the X-Y plan relative to the base plate 8.

In general, defects caused by excessive heat can be corrected by reducing the energy of electron gun 5/electron beam 6 and/or by raising the rate of movement of wire feeder 12 in the direction X and/or by increasing the wire feed rate. Conversely, defects resulting from insufficient heat can be corrected by reducing the power of electron gun 5/electron beam 6 and/or reducing the movement of the wire feeder 12 in the direction X and/or reducing the wire feed rate.

Table 1 (below) summarizes qualitatively how well the five sensors capture data to address the EBF$^3$ process challenges.

TABLE 1

Summary of sensor suitability to measure features associated with EBF$^3$ process challenges.

| EBF$^3$ Process Challenges | Sensor Technology | | | | |
|---|---|---|---|---|---|
| | Section 4.1: Internal Mount CMOS Camera | Section 4.2: Fiber Optic + External Mount CCD Camera | Section 4.3: Internal Mount Backscattered Electron (BSE) Detector | Section 4.4: Internal Mount CCD Camera | Section 4.5: Internal Mount SWIR Camera |
| 1) Deposition environment (vapor contamination; vacuum compatibility) | Pinhole optics; Cold plate for camera cooling | Pinhole w/ fiber optics; Externally mounted | Vapor shield; Fully vacuum compatible | Pinhole optics; Cold plate for camera cooling | Pinhole optics; Cold plate for camera cooling |
| 2) Thermal transients | Yes | Limited | No | Yes | Yes |
| 3) Alloy physical properties/melting range | NIR signature | NIR signature | n/a | NIR signature | SWIR signature |
| 4) Height measurement (with one camera) | Limited | Limited | Not demonstrated | Limited | Limited |
| 5) Width measurement | Yes | Limited | Yes, but not demonstrated in real time | Yes | Limited |
| 6) Wire/molten pool tracking | Yes | Limited | Not demonstrated | Yes | Limited |
| 7) Real-time flaw detection | Yes | Limited | Limited | Yes | Yes |

Various issues associated with the deposition environment can be corrected as shown in Table 2.

TABLE 2

| | | Deposition Environment | |
|---|---|---|---|
| # | EBF3 Process Challenge | Manifestation in Deposit | Corrective Action Required |
| 1 | Deposition Environment | | |
| 1a | vacuum | not an impact to deposit; affects ability to measure key features-sensor electronics overheat | install cooling jacket; sensor selection with low heat generating electronics/vacuum compatibility |
| 1b | vacuum | not an impact to deposit; affects ability to measure key features-sensor outgassing | use vacuum compatible materials for sensors, packaging, wires; vacuum-compatible lubricants if needed |
| 1c | metal vapor | not an impact to deposit; affects ability to measure key features-sensor optics occluded/changes over time as vapor builds up | pinhole optics with or without argon (inert gas) back pressure; scrolling mylar film over windows/optics; mirrors; ion shield; select sensors not sensitive to metal vapor deposition |
| 1d | constrained gun-to-work distance & moving gun | not an impact to deposit; affects ability to measure key features-tight space to install sensors; sensor location and angle to adequately view and track molten pool as it traverses across the parts | mirrors & small sensors installed on moving gun and fit within gun-to-work distance; remote sensors may be usable for wider field views |

TABLE 2-continued

Deposition Environment

| # | EBF3 Process Challenge | Manifestation in Deposit | Corrective Action Required |
|---|---|---|---|
| 1e | radiation (from electron beam) | not an impact to deposit; affects ability to measure key features- leaded glass windows not IR transparent | use IR transparent windows with radiation protection shroud around externally- mounted sensors; install sensors or transmission lines (such as fiber optic cables) inside chamber |

The Process Challenges and Corrective Actions of Table 2 are believed to be straightforward, such that a detailed description is not necessary.

With reference to Table 3, various issues related to thermal transients can be detected/measured and corrected as shown.

TABLE 3

Thermal Transients/Control

| | $EBF^3$ Process Challenge | Manifestation in Deposit | Corrective Action Required |
|---|---|---|---|
| 3a | Instantaneous transients (molten pool traversing over cold baseplate) | Fluxuations in molten pool and bead width along length | Rapid monitoring of molten pool, change raster pattern to correct (deflect back or to sides to spread heat more evenly); high speed detection and corrective action |
| 3b | Build-up of background heat (due to multiple layers) | Gradual increase in molten pool size (length width, aspect ratio, area, centroid) resulting in mushrooming of bead width (first layer narrower than subsequent layers due to changing cooling path) | Long-term tracking of molten pool size & shape; reduce power to correct; low speed detection and corrective action |
| 3c | Changing cooling path (as build up part, due to conductive-only cooling path) | Changing thermal patterns results in different bead geometries & microstructures | Long-term tracking of molten pool size & shape; reduce power to correct; low speed detection and corrective action |

In an Electron Beam Freeform Fabrication ($EBF^3$) process according to one aspect of the present disclosure, an electron beam 6 (FIG. 8) is used as a heat source to create a small molten pool 64 on a substrate 8 into which wire 13 is fed. The electron beam 6 and wire feed assembly 12 are translated with respect to the substrate 8 to follow a predetermined tool path. This process is repeated in a layer-wise fashion to fabricate metal structural components.

$EBF^3$ is an inherently thermally transient process. Several factors contribute to this, beginning with its layer-additive nature. The continuously moving molten pool 64 over a relatively cold baseplate 8 or previous layer encounters a different cooling path and thermal mass with each successive layer. Variations in the geometry of the part such as section thickness changes, ends or corners also contribute to these changes. Thermal transients can be taken into account by controller 72 to enable repeatability necessary for certification of additive manufacturing processes for use in many applications. Sensors (e.g. cameras 14, 24) capable of detecting/measuring thermal distributions may be utilized to detect/track changes in the molten pool 64 by detecting the thermal gradients between liquid and solid phases over time.

Thermal gradients from deposition onto a cold substrate 8 can cause rapid fluxuations in the molten pool 64, resulting in changing width W (FIG. 8) at bead 63 along the length of the bead 63. Over time, the background heat and changing cooling path tends to result in a gradual increase in the molten pool size (length, width, area, aspect ratio, or centroid) causing an increase in the bead widths W. High speed imaging (>10 frames per second) of the molten pool 64, using optical, near infrared, infrared, or band-passed filtered optical cameras 14, 24 or pyrometers may be implemented to measure the molten pool size, shape and/or temperature. Controller 72 may be configured (e.g. programmed) to monitor these measurements and compare the measured values to baseline values. When the measurements are within a predefined threshold set by the user, no modifications to the deposition parameters are made by controller 72. When the measurements are outside (above or below) the threshold, the frequency and amplitude of the fluxuations are measured. For high frequency fluxuations, the electron beam focus and raster pattern can be adjusted to match the frequency of the fluxuation, increasing or decreasing the size of the beam and raster or deflecting the electron beam 6 ahead, to the sides, or behind the molten pool 64 to smooth the shape of the bead 63. For gradual changes in the molten pool size (length, width, area, aspect ratio, or centroid) or increase or decrease in the length of the cooling path behind the molten pool 64, the beam power (current and/or accelerating voltage) is increased (when the molten pool 64 is shrinking) or decreased (when the molten pool 64 is growing) by a small increment (1-2 milliamps or 1-2 kilovolts). Since the response time of the gradual thermal gradients is slow, a change is made in the beam power, then the molten pool 64 and/or cooling tail sizes are monitored for one or more seconds before another change is made.

Table 4 is a summary of various issues related to thermal properties and associated corrective actions.

TABLE 4

| | | Alloy Thermal Properties | |
|---|---|---|---|
| | EBF$^3$ Process Challenge | Manifestation in Deposit | Corrective Action Required |
| 4a | Melting temperature detectable with imaging sensors (to detect edges of molten pool) | Lower melting temperature alloys not visible with same sensor as higher melting temperature alloys | Selection of appropriate sensors to detect lower temperatures; calibration of sensors to lower melting temperatures; use of reflectance changes from molten to solid to detect molten pool boundaries; low speed detection and corrective action; does not require continuous monitoring or adjustments once set |
| 4b | Liquidus/solidus range detectable with imaging sensors (to detect edges of molten pool and trace cooling path in tail area) | Affects precision of deposit and control possible | Selection of appropriate sensors to detect lower temperatures; calibration of sensors to lower melting temperatures; use of reflectance changes from molten to solid to detect molten pool boundaries; low speed detection and corrective action; does not require continuous monitoring or adjustments once set |
| 4c | Specific heat | Affects selection of power, travel speed | Power increased, travel speed decreased, and/or wire feed rate decreased simultaneously to increase power to melt (converse is also true to decreased power to melt); low speed detection and corrective action; does not require continuous monitoring or adjustments once set |
| 4d | Thermal conductivity | Affects selection of power, travel speed | Power increased, travel speed decreased, and/or wire feed rate decreased to increase power to melt (converse is also true to decreased power to melt); low speed detection and corrective action; does not require continuous monitoring or adjustments once set |
| 4e | Vapor pressure (function of temperature & pressure) | Dealloying in molten pool (& resulting deposit); causes build-up on inside of system & on sensor optics | Reduce power (accelerating voltage and/or beam current) increase travel speed and/or wire feed rate to reduce temperature, reduce molten pool size & duration of exposure of molten pool surface to vacuum; change beam focus to switch between keyhole vs. conduction mode; low speed detection and corrective action; does not require continuous monitoring or adjustments once set |
| 4f | Emissivity | Different alloys not visible with same sensor settings | Use independent sensor calibration (with black body radiation source); use handbook values to adjust empirically; may be able to approximate liquidus/solidus range based on change in reflectivity; low speed detection and corrective action; does not require continuous monitoring or adjustments once set |
| 4g | Molten viscosity | Affects wire feed direction, ability to build unsupported overhangs | Change deposition angle of beam and wire entry angle into molten pool with respect to deposit and/or changing a raster pattern of the wire source and/or the electron beam; low speed detection and corrective action |

TABLE 4-continued

Alloy Thermal Properties

| | EBF³ Process Challenge | Manifestation in Deposit | Corrective Action Required |
|---|---|---|---|
| 4h | Surface tension | Affects wire feed direction, ability to build unsupported overhangs | Change deposition angles of beam and wire entry angle into molten pool with respect to deposit and/or changing a raster pattern of the wire source and/or the electron beam; low speed detection and corrective action |
| 4i | Brightness/high intensity of molten pool and surrounding plasma plume | Not an impact to deposit; affects ability to measure key features-washes out or saturates sensors, reducing detectability of lower melting temperature regions of interest | Band pass filtering to reduce intensity; shorter shutter speeds/integration times to prevent sensor saturation; electronic selection of different regions of interest and setting different integration times for different regions; sensor selection to reduce or eliminate pixel saturation and bloom; low speed detection and corrective action; does not require continuous monitoring or adjustments once set |

Differing vapor pressures of the alloying additions can result in selective de-alloying (constituent loss) in the deposited material (e.g. deposit 66, FIGS. 8 and 9). Controlling the temperature of the EBF³ process impacts alloy compositional losses. Sensors 14 or 24 (FIGS. 4 and 9) may comprise a spectrometer that is configured to measure the energy or wavelength of the ion species in the vapor plume 74 and/or or the x-rays produced from the electron beam 6 interacting with the molten pool 64. This data can be utilized by controller 72 to identify the chemical species in the vapor or plasma plume 64 created by the electron beam 6. Specifically of interest is quantifying the amount of different alloying addition species in the vapor/plasma plume 74. If the ratio of species in the vapor plume 74 are similar to the ratio of these elements in the target alloy chemistry, no action is required. However, if the ratio of the species in the vapor plume 74 differs by more than a predefined maximum allowable amount (e.g. about 10%, about 15%, about 20%) some corrective action may be desired to maintain a more uniform alloy chemistry. To reduce the size of the vapor plume 74, several corrective actions may be taken. For example, softening the beam focus (moving to a wider beam) to switch between keyhole vs. conduction mode mitigates (reduces) the degree of vaporization. Reducing the power (reducing accelerating voltage and/or beam current) and/or increasing the translation speed and wire feed rate reduces the temperature of the material in the molten pool 64, and also reduces the size of molten pool 64. Reducing the size of molten pool 64 (width, length, area, aspect ratio, or centroid) mitigates the size of the vapor plume by reducing the duration of exposure of the molten pool surface to vacuum. Selective vaporization cannot be entirely eliminated because this is a physical property of elements, but it can be mitigated by reducing the amount of overheating, size of the molten pool 64, and duration of exposure of the molten pool surface to vacuum.

Tables 5, 6, and 7 summarize issues associated with height/width measurement, wire entry, and wire anomalies, respectively.

TABLE 5

Height/Width Measurement

| | EBF³ Process Challenge | Manifestation in Deposit | Corrective Action Required |
|---|---|---|---|
| 5a | Starts | Build up bulbs (extra height and width at start, due to incorrect timing between beam on, wire feed entering molten pool, and travel speed-controlling inertias) | Adjust timing of starting beam power, beam raster, travel speed, wire feed rate; high speed detection and corrective action, short duration |
| 5b | Necking-narrowing of deposit within layer being deposited (along length of deposition direction) or at base of deposit (first layer narrower than subsequent layers due to changing cooling path) | Narrowing of deposit, often just behind a bulb at start or at abrupt change in build direction | Can control if eliminate bulbs at starts & abrupt changes in geometry; high speed detection and corrective action, short duration |
| 5c | Stops | Depression of height, cratering of molten pool, tailing off (height drops due to thinner layer deposited) | Adjust timing of ending beam power, beam raster, travel speed, wire feed rate; high speed detection and corrective action, short duration |

TABLE 5-continued

Height/Width Measurement

| | EBF³ Process Challenge | Manifestation in Deposit | Corrective Action Required |
|---|---|---|---|
| 5d | Abrupt changes in build direction | Narrowing/widening of deposit and increase/decrease in height before during and after abrupt changes in build direction | Adjust timing of beam power, beam raster, travel speed, wire feed rate-possible feed-forward option to program known geometric effects with programmed changed as approach changes in direction; high speed detection and corrective action, short duration |

As shown in Table 6, various issues associated with the wire entry direction can be corrected as shown.

TABLE 6

Wire Entry Direction

| | EBF³ Process Challenge | Manifestation in Deposit | Corrective Action Required |
|---|---|---|---|
| 6a | wire enters leading edge of molten pool | narrower deposit | no correction required |
| 6b | wire enters trailing edge of molten pool | easily freezes wire in molten pool (wire stick or stabbing/wire dragging) | slight increase in wire feed height distance to avoid wire sticks, raster beam across wire to preheat/melt, decrease wire feed rate, increase wire elevation angle into molten pool; high speed detection and corrective action |
| 6c | wire enters side of molten pool | wider molten pool due to wire pushing molten pool over | slight increase in wire feed height distance to avoid wire sticks, raster beam up wire to preheat/melt, decrease wire feed rate, increase wire elevation angle into molten pool; high speed detection and corrective action |
| 6d | wire enters at an angle into molten pool (relative to travel direction) | wider molten pool due to wire pushing molten pool over | depends on whether angle is closer to entering leading edge vs. side or trailing edge of molten pool-vary wire feed height distance, raster beam up wire to preheat/melt, wire feed rate, and wire elevation angle into molten pool as a function of the direction of wire feed with respect to translation direction; high speed detection and corrective action |
| 6e | side-by-side fills | overlaps/gaps critical in controlling heat build-up and geometry of built parts | programmed path planning to push into side vs. reaching over previously deposited bead; low speed detection and corrective action |
| 6f | wire elevation (entry angle relative to horizontal) | angle too low limits build shapes due to hardware crashes, incorrect angle can contribute in wire anomalies (detailed below) | 45 degrees is ideal; lower angle gives shorter wire time in beam before entering molten pool & pushes molten pool when fed to side; higher angle difficult to achieve with size of gun but directs wire into molten pool (better for wire entering side or trailing edge of molten pool); high speed detection and corrective action, does not require continuous monitoring or adjustments once set |

TABLE 7

Wire Anomalies

| | EBF³ Process Challenge | Manifestation in Deposit | Corrective Action Required |
|---|---|---|---|
| 7a | Lack of wire cleanliness (from dust due to poor storage conditions, oxidation due to age and poor storage conditions, residual lubricants from wire drawing) | May be difficult to detect in process-sparking or ejecta during deposition, brighter or different plasma vapor plume; manifests as small porosity, inclusions or minor localized chemistry variations in deposit | If detected, insert note into data set; if greater than set threshold value, halt deposition and inspect/clean or replace wire spool; high speed detection and corrective action, short duration |
| 7b | Abrupt thermal gradients in wire due to feeding into molten pool (lack of wire preheat) | At higher wire feed rates, can result in incomplete wire melting or "chopped" wire bits transmitted into molten pool; reduced diameter wire sticks out of side of deposit | Beam focus and deflection up wire to preheat wire; use of external wire preheating (resistance, inductance, radiant-careful not to induce EMI that will interfere with electron beam); reduce wire feed rate; switch to smaller diameter wire; high speed detection and corrective action, short duration |
| 7c | Dripping (due to excess heat, insufficient wire feed or wire feed height distance too high) | Irregular height, compounds with multiple layers | Increase wire feed rate; decrease beam power (current); increase travel speed; adjust wire feed height distance; high speed detection and corrective action |
| 7d | Stabbing/wire dragging (due to insufficient heat, excess wire feed, or wire feed height distance too low) | Wire oscillates back and forth, traces grooves in deposit, deflects off bottom of molten pool and diverts out of beam/molten pool | Decrease wire feed rate; increase beam power (current); decrease travel speed; adjust wire feed height distance; high speed detection and corrective action |
| 7e | Wire cast (residual stress, curvature or twist in wire) curls wire away from molten pool | Wire sticks out of side of deposit, wire misses beam/molten pool altogether, wire oscillates back and forth, wire position is biased to one side of the molten pool | Improved wire straighteners in system; beam deflection across wire to redirect into molten pool; high speed detection and corrective action |
| 7f | Poor timing of wire/beam starts & stops | Wire stick/freezes in molten pool (resulting in pulling gun/wire feeder out of alignment, can leave cracks or unmelted wire in deposit), wire retracts too early results in excess heat buildup, reducing deposit height and increasing width locally | Feed-forward approach (pre-program starts and stops based on empirical or theoretical timing); monitor for anomalies and set threshold to interrupt build if anomalies detected are above threshold; increase preheat; detect quickly-stop, back up translation, turn on beam to cut wire, then adjust wire feed height distance; high speed detection and corrective action, short duration |
| 7g | Wire position too high/low or wire feeder rotated, so wire does not enter molten pool at correct location | Too high-dripping; too low-stabbing or dragging; rotated-wire sticks out side of deposit or misses beam/molten pool altogether or wire position is biased to one side of the molten pool | Alignment check before initiating deposition; adjust position of wire feeder with respect to molten pool/deposition surface; interrupt build if wire detected outside molten pool; high speed detection and corrective action, short duration |

Geometric variations in the deposit 66 (FIGS. 8 and 9) that result from imperfect coordination of heat and mass flow (electron beam power and wire feed) during starts, stops and abrupt changes in build direction to follow a desired part feature (such as taking a 90-degree turn, changing from deposition in the "X" direction to deposition in the "Y" direction in a rectilinear translation configuration). These variations include bulbs (build-up of excess material at starts), necking (narrowing of the deposit) or tailing-off (deficit in deposit height approaching a stop), and build-up followed by necking around corners. Both bead widths W (FIG. 9) and height H (FIG. 8) of the deposited material 66 are affected by these changes in translation speed and geometry. The height H is typically a more critical variable because it has an accumulative effect if uncorrected. Since the EBF³ process is a layer-additive process, even minute perturbations in height H will accumulate into large errors over time as the build progresses (for example, parts measuring as small as 10 cm in height can represent over 100 layers). Therefore, the sensor type and its location in the build chamber preferably enable precise measurement of the bead height H in addition to bead width W. High speed imaging (>10 frames per second) may be utilized to capture these events, since they involve a complex timing of translation speed and direction, wire feed, and beam start/stop that occurs very quickly.

Imaging may be accomplished with one or more near-infrared, infrared, or band-pass filtered optical cameras (14, 24) positioned at an angle with respect to the molten pool 64 to allow observation of bead height H. Most angles will work, as long as the camera (14, 24) is not oriented straight down on the molten pool 64 (looking along the axis of the electron beam 6). The geometry of the location of the camera is typically fixed, so the vertical and horizontal location of the molten pool 64 relative to the wire feeder 12 and substrate 8 can be determined with simple trigonometry. Identification of the location of the molten pool 64 may be determined by calculating the centroid and comparing it to the wire location. As the centroid moves closer to the wire location, the height H is increasing, and as the centroid moves farther away from the wire location, the height H is decreasing. This height measurement can then be used by controller 72 to increase or decrease the wire feed rate to raise (increased wire feed rate) or lower (decreased wire feed rate) the height H of the deposited bead 63. Furthermore, the wire feed rate can be synchronized with the translation speed, using the X and Y speeds from feedback on the X and Y translation stage motors, to automatically correct the wire feed rate for speed changes at starts, stops, and changes in translation direction. The measured height H would further increase or decrease the wire feed rate to maintain a constant height H across the entire layer on the part. If the wire feed rate cannot be synchronized to the translation speed, corrections based solely on height H will also work (i.e. the wire feed rate does not necessarily need to be synchronized with the translation speed).

Control of the EBF³ process also includes consideration of the relative direction of wire in-feed and deposit direction to the geometric variations in the deposit 66. Changes in the orientation of wire 13 with respect to the translation direction (e.g., wire lagging or pushing the molten pool 64, or entering from the side) and wire elevation (e.g., entry angle α, relative to the horizontal) can subtly change the geometry of the deposit. Also, parts may require multiple side-by-side beads 63 to develop the required section width, and the shape of the molten pool 64 depends upon the presence and relative location of adjacent beads 63. For example, for multi-bead deposits it is often easier to "push into" adjacent beads than to reach over them but this is not always possible due to other constraints. Use of cameras (such as optical, band-pass filtered optical, near-infrared, infrared) to measure the width W of the bead 63 and the direction of travel can be used to monitor the effects of relative direction of wire in-feed into the molten pool 64. The control system 72 is programmed to make minor adjustments based on the direction of the wire feed into the molten pool 64 as follows: If the wire 13 is feeding into the trailing edge of the molten pool 64 or into the side of the molten pool 64, the beam power may be increased slightly (1 milliamp or 1 kilovolt), the electron beam deflection may be changed to deflect the beam 6A onto the wire 13 to preheat the wire 13 before it enters the molten pool 64, the translation speed may be decreased by 1-2 inches per minute, the wire feed rate can be decreased by 5-10 inches per minute, or the wire feed height distance HW (FIG. 8) can be increased by 0.001 to 0.002 inches to reduce the potential for wire sticks. The amount of change may be maximum when the wire 13 is feeding into the trailing edge of the molten pool 64, and proportionally less as the translation direction approaches the wire feeding into the leading edge of the molten pool. If the wire 13 is entering into the leading edge of the molten pool 64, corrections are typically not required. For side-by-side beads for a fill pattern, the electron beam power may be increased slightly and/or may be deflected slightly such that the beam 6 impinges on the side of the neighboring bead to facilitate edge bonding.

Random process errors result from variability in the wire feed. The wire 13 is generally at or near room temperature until it crosses into the electron beam path, at which point it is subjected to an abrupt thermal gradient, melting over a very short distance as it enters the molten pool 64. Larger diameter wire, therefore, retains substantial stiffness as it enters the molten pool 64, which may, result in various errors or defects. In the event of excess heat, insufficient wire feed, or wire feeding above the electron beam/substrate intersection point, dripping may occur. Conversely, insufficient heat, excess wire feed, or wire feeding below the electron beam/substrate intersection point may result in wire stabbing which can cause the wire 13 to oscillate back and forth in the molten pool 64; skip, causing fluctuations in the deposit height H; or deflect off the bottom of the molten pool 64 and divert out of the beam 6 altogether.

Improper wire location or poor timing of the start/stop sequence may result in wire sticks. Some errors of this nature may occur due to cast (residual curvature or twist in the wire 13 not removed by the wire straightener) or simple mechanical misalignment of the wire feed apparatus 12 that may not be immediately apparent. To measure wire feed anomalies, an important feature to track is the position of wire 13 relative to the molten pool 64. This may be accomplished with optical, near infrared, infrared, or band-pass filtered optical cameras (14, 24), where the camera is focused on the molten pool 64 and wire entry into the molten pool 64. Because the wire 13 is entering the electron beam 6 above the surface of the molten pool 64, it appears as a step feature in the molten pool images, when viewed from most angles (except for within about 15 degrees of straight down on the molten pool 64). The wire location (either the edges of the wire or the calculated centroid) may be tracked relative to the molten pool 64 (again, using either the edges of the molten pool 64 or the calculated centroid). The wire location preferably remains in a constant relationship to the molten pool 64 (i.e. they line up on the same centerline at a constant distance apart). Corrective actions may be implemented by controller 72 if the wire location changes with respect to the molten pool location by more than a preset threshold amount.

At higher wire feed rates, incomplete wire melting or "chopped" wire bits transmitted into molten pool 64 or bits of wire 70 (FIG. 9) may exit the molten pool 64 and stick out of side of deposit 66. This may be corrected by defocusing the electron beam 6 and/or by deflecting the electron beam 6A towards the wire 13 to preheat the wire 13, increasing the electron beam power, or reducing the wire feed rate. Dripping occurs when the height H of the deposit 66 is too low and the distance between the wire 13 and the molten pool 64 increases to the point that the wire 13 melts in the beam 6 above the molten pool 64. Drips 68 (FIGS. 8 and 9) begin with an instability in the molten pool 64 and an increase in the distance between the wire location and the molten pool 64. Correction action may include increasing the wire feed rate, and/or by decreasing the power and/or by increasing the translation speed. Corrective action is preferably taken early when the wire location increases the distance from the molten pool 64, thereby eliminating most occurrences of dripping. In the event that the wire location is too close to the molten pool 64 (height H of the deposit 66 is too high), the wire 13 may start stabbing, oscillating back and forth, and/or dragging. This may be detected by a decrease in the distance between the wire location and the molten pool 64, and may be corrected by decreasing wire feed rate, increasing beam power, or decreasing translation speed. If residual curvature is present in the wire, the wire 13 may not enter the molten pool 64 from a consistent location. The corrective action when the wire location is changing, particularly on a low frequency (<3 to 5 Hz) basis, may be to either automatically jog the wire (if the wire feeder 12 is equipped with a translation motor) or to deflect the electron beam 6A up the sides of the wire 13 to direct the wire 13 into the molten pool 64 (deflection of a beam up the sides of wire is disclosed in U.S. Pat. No. 8,344,281).

As shown in Table 8 below, various issues associated with miscellaneous factors can be corrected as shown.

TABLE 8

Miscellaneous Factors

| EBF$^3$ Process Challenge | Manifestation in Deposit | Corrective Action Required |
| --- | --- | --- |
| 8a Vapor condensate flakes off wire feeder nozzle, electron beam gun, or other facing surfaces and lands in molten pool | Produces voids and porosity or inclusions in final deposit; if condensate buildup is large enough (such as bead forming at end of wire tip) can freeze out molten pool and cause wire stick or large geometric discontinuity in local bead height/width | Clean facing surfaces between deposition runs; monitor condensate build-up and identify threshold to interrupt for cleaning surfaces; design gun and wire feeder shielding to minimize surface area facing molten pool; apply line-of-sight shielding that can be removed/replaced (such as Al foil wrap); high speed detection and corrective action, short duration |
| 8b No wire feed (due to wire jams, birds nest, empty wire spool) or low wire feed (wire drive rollers slipping, friction in wire guide tubes) | Molten pool increases in size rapidly, height drops (due to overheating with no wire feed) | Adjust wire feed rate; adjust tension on wire feeder; interrupt build to manually correct wire feed issues (replace wire spool, cut out wire birds nests, fix wire jams, etc.); high speed detection and corrective action, short duration |

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A method of controlling operation of an electron beam gun and wire feeder during a deposition process including deposition of pools of molten metal onto a substrate to form beads upon solidification of the molten metal, the method comprising:

providing a substrate;

providing a wire source that feeds wire at a wire feed rate;

moving the electron beam gun and/or the wire feeder relative to the substrate at a travel speed;

melting the wire utilizing an electron beam generated by an electron beam gun to form liquid phase metal on the substrate;

cooling the liquid phase metal to form a solidified deposit;

forming a molten pool on the solidified deposit by heating and melting the wire utilizing the electron beam generated by the electron beam gun at a beam power;

capturing thermal data from the molten pool and the solidified deposit under the molten pool utilizing a near-infrared (NIR) sensor, wherein the thermal data captured by the NIR sensor results from the heating of the wire to form the molten pool and the solidified deposit under the molten pool;

evaluating the thermal data to determine a thermal diffusivity of the solidified deposit behind or under the molten pool to identify at least one attribute, wherein the at least one attribute comprises a detected subsurface flaw embedded in the solidified deposit;

determining an adjustment configured to correct an anomaly associated with the at least one attribute, wherein the anomaly is at least one of a change in bead dimensions, a void, an inclusion, porosity, cracking, and a lack of layer fusion, in the solidified deposit; and adjusting a deposition process parameter for forming a subsequent molten pool on the substrate or solidified deposit using the electron beam gun and the wire feeder according to the determined adjustment.

2. The method of claim 1,
wherein adjusting the deposition process parameter for forming the subsequent molten pool on the substrate or solidified deposit using the electron beam gun and the wire feeder according to the determined adjustment comprises adjusting a raster pattern of the electron beam to deflect back, or to the sides to spread heat, wherein the beam raster pattern is adjusted at speeds of at least about 5 Hz.

3. The method of claim 1,
wherein the at least one attribute further comprises detected changes in molten pool size and shape, wherein molten pool size and/or shape comprises at least one of pool width, pool length, pool aspect ratio, pool area, and pool centroid; and
wherein adjusting the deposition process parameter for forming the subsequent molten pool on the substrate or solidified deposit using the electron beam gun and the wire feeder according to the determined adjustment comprises adjusting one or more of beam raster, beam focus, beam deflection, and/or wire position to increase or reduce molten pool size and/or to change molten pool shape, wherein changes in pool size and/or shape are detected.

4. The method of claim 1,
wherein the at least one attribute further comprises detected changing thermal patterns that result in different bead geometries and/or microstructures;
wherein adjusting the deposition process parameter for forming the subsequent molten pool on the substrate or solidified deposit using the electron beam gun and the wire feeder according to the determined adjustment comprises adjusting one or more of beam raster, beam focus, beam deflection, wire position to correct bead geometries and/or microstructures; and
wherein changing thermal patterns are detected at speeds of at least about 5 Hz, and adjustments occur at speeds of about 25% or less of the detection speed.

5. The method of claim 1,
wherein the at least one attribute further comprises detecting a thermal gradient of the molten pool; and
wherein adjusting the deposition process parameter for forming the subsequent molten pool on the substrate or solidified deposit using the electron beam gun and the wire feeder according to the determined adjustment comprises adjusting one or more of beam raster, beam focus, beam deflection, and/or wire position to melt the wire.

6. The method of claim 1,
wherein the at least one attribute further comprises detected dealloying in the molten pool; and
wherein adjusting the deposition process parameter for forming the subsequent molten pool on the substrate or solidified deposit using the electron beam gun and the wire feeder according to the determined adjustment comprises changing focus of the electron beam and/or changing the raster pattern of the electron beam and/or changing deflection of electron beam to reduce a temperature of the molten metal.

7. The method of claim 1,
wherein the at least one attribute further comprises detected viscosity of the molten pool; and
wherein adjusting the deposition process parameter for forming the subsequent molten pool on the substrate or solidified deposit using the electron beam gun and the wire feeder according to the determined adjustment comprises angularly repositioning the electron beam gun and/or the wire feeder to change a beam angle relative to the molten pool and/or a wire entry angle relative to the molten pool to control the viscosity of the molten metal.

8. The method of claim 1,
wherein the at least one attribute further comprises detected surface tension of the molten pool; and
wherein adjusting the deposition process parameter for forming the subsequent molten pool on the substrate or solidified deposit using the electron beam gun and the wire feeder according to the determined adjustment comprises angularly repositioning the electron beam gun and/or the wire feeder to change a beam angle relative to the molten pool and/or a wire entry angle relative to the molten pool to reduce or increase the surface tension.

9. The method of claim 1,
wherein the at least one attribute further comprises detected excessive height and/or width of the molten pool at a start sequence of the deposition process;
wherein adjusting the deposition process parameter for forming the subsequent molten pool on the substrate or solidified deposit using the electron beam gun and the wire feeder according to the determined adjustment comprises adjusting timing of one or more of a starting beam power, a travel speed, and/or a wire feed rate to reduce a height and/or a width of the molten pool; and
wherein excessive height and/or width is detected at speeds of at least about 10 Hz, and adjustments occur at speeds of at least about 1 Hz during the start sequence of the deposit.

10. The method of claim 1,
wherein the at least one attribute further comprises detected narrowing of the molten pool and/or the solidified deposit; and
wherein adjusting the deposition process parameter for forming the subsequent molten pool on the substrate or solidified deposit using the electron beam gun and the wire feeder according to the determined adjustment comprises adjusting one or more of beam raster, beam focus, beam deflection, and/or wire position to increase a width of the solidified deposit.

11. The method of claim 1,
wherein the at least one attribute further comprises detected variations in one or more of a solidified deposit height, a solidified deposit width, and shape at a stop location during a stop sequence of the deposition process;

wherein adjusting the deposition process parameter for forming the subsequent molten pool on the substrate or solidified deposit using the electron beam gun and the wire feeder according to the determined adjustment comprises adjusting one or more of beam raster, beam focus, beam deflection, and/or wire position to provide at least one of a uniform height, a uniform width, and a uniform shape of the solidified deposit; and wherein variations are detected at speeds of at least about 10 Hz and adjustments occur at speeds of at least about 1 Hz during the stop sequence of the deposit.

12. The method of claim 1,
wherein the at least one attribute further comprises detected variations in one or more of a solidified deposit width and a solidified deposit height due to changes in build direction during programmed build direction changes of the deposition process;
wherein adjusting the deposition process parameter for forming the subsequent molten pool on the substrate or solidified deposit using the electron beam gun and the wire feeder according to the determined adjustment comprises adjusting one or more of beam raster, beam focus, beam deflection, and/or wire position to reduce variations in at least one of a solidified deposit width and height; and
wherein variations are detected at speeds of at least about 5 Hz, and adjustments occur at speeds of at least about 1 Hz during programmed build direction changes of the deposition process.

13. The method of claim 1,
wherein the at least one attribute further comprises detected incomplete wire melting;
wherein adjusting the deposition process parameter for forming the subsequent molten pool on the substrate or solidified deposit using the electron beam gun and the wire feeder according to the determined adjustment comprises adjusting the deposition process by providing beam focus and deflection up wire to preheat the wire and/or preheating the wire utilizing a heater and/or reducing the wire feed rate; and
wherein incomplete wire melting is detected at speeds of at least about 5 Hz, and adjustments occur at speeds of at least about 1 Hz for a duration of about 5 seconds or more after an initial detection of incomplete wire melting occurs.

14. The method of claim 1,
wherein the at least one attribute comprises detected dripping of melted wire;
wherein adjusting the deposition process parameter for forming the subsequent molten pool on the substrate or solidified deposit using the electron beam gun and the wire feeder according to the determined adjustment comprises adjusting the deposition process by changing a wire position; and
wherein dripping of melted wire is detected at speeds of at least about 10 Hz, and adjustments occur at speeds of at least about 1 Hz for a duration of about 5 seconds or more after an initial detection of dripping occurs.

15. The method of claim 1,
wherein the at least one attribute further comprises detected stabbing and/or wire dragging;
wherein adjusting the deposition process parameter for forming the subsequent molten pool on the substrate or solidified deposit using the electron beam gun and the wire feeder according to the determined adjustment comprises adjusting beam raster, beam focus, beam deflection, and/or wire position; and
wherein stabbing/wire dragging is detected at speeds of at least about 10 Hz, and adjustments occur at speeds of at least about 1 Hz for a duration of about 5 seconds or more after an initial detection of stabbing/wire dragging occurs.

16. The method of claim 1,
wherein the at least one attribute further comprises detected one or more of residual stress, curvature, or twist in the wire;
wherein adjusting the deposition process parameter for forming the subsequent molten pool on the substrate or solidified deposit using the electron beam gun and the wire feeder according to the determined adjustment comprises adjusting the deposition process by providing beam deflection across the wire to redirect the wire into the molten pool; and
wherein detecting one or more of residual stress, curvature, or twist in the wire occurs at speeds of at least about 10 Hz, and adjusting the deposition process occurs at speeds of at least about 1 Hz for a duration of about 5 seconds or more after an initial detection of a wire anomaly occurs.

17. The method of claim 1,
wherein the at least one attribute further comprises detection that the wire does not enter the molten pool at a desired location;
wherein adjusting the deposition process parameter for forming the subsequent molten pool on the substrate or solidified deposit using the electron beam gun and the wire feeder according to the determined adjustment comprises adjusting the deposition process by adjusting a position of the wire feeder relative to the molten pool;
wherein detecting occurs at speeds of at least about 10 Hz, and adjusting the deposition process occurs at speeds of at least about 1 Hz for a duration of about 5 seconds or more after an initial detection of wire not entering the molten pool at a desired location occurs; and
wherein the method further comprises halting the process if wire is detected outside the molten pool for at least about 1.0 seconds.

18. The method of claim 1, wherein the sensor is mounted on an instrumentation ring attached to the electron beam gun.

19. The method of claim 1, further comprising selecting the sensor from a plurality of sensors based on the at least one attribute.

20. The method of claim 1, wherein the thermal data is directly captured from the molten pool and the solidified deposit under the molten pool.

\* \* \* \* \*